(12) United States Patent
Kusafuka

(10) Patent No.: US 11,385,470 B2
(45) Date of Patent: Jul. 12, 2022

(54) IMAGE PROJECTION APPARATUS AND MOBILE BODY

(71) Applicant: KYOCERA Corporation, Kyoto (JP)

(72) Inventor: Kaoru Kusafuka, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 233 days.

(21) Appl. No.: 16/628,205

(22) PCT Filed: Jul. 2, 2018

(86) PCT No.: PCT/JP2018/025052
§ 371 (c)(1),
(2) Date: Jan. 2, 2020

(87) PCT Pub. No.: WO2019/009240
PCT Pub. Date: Jan. 10, 2019

(65) Prior Publication Data
US 2020/0150431 A1    May 14, 2020

(30) Foreign Application Priority Data

Jul. 7, 2017  (JP) .............................. JP2017-134113

(51) Int. Cl.
*G02B 27/14* (2006.01)
*G02B 30/22* (2020.01)
(Continued)

(52) U.S. Cl.
CPC .......... *G02B 27/145* (2013.01); *B60K 35/00* (2013.01); *G02B 27/0101* (2013.01);
(Continued)

(58) Field of Classification Search
CPC ........ G02B 30/20; G02B 30/22; G02B 30/26; G02B 30/52; G02B 30/54; G02B 27/145;
(Continued)

(56) References Cited

U.S. PATENT DOCUMENTS 8,279,271 B2 * 10/2012 Choi .................... H04N 13/346
348/58
9,188,779 B2   11/2015 Sakai
(Continued)

FOREIGN PATENT DOCUMENTS

CN        106405836 A     2/2017
JP        2014-068331 A   4/2014
(Continued)

*Primary Examiner* — Jade R Chwasz
(74) *Attorney, Agent, or Firm* — Studebaker & Brackett PC

(57) ABSTRACT

An image projection apparatus includes a projection light emission unit, a first optical element, a second optical element, and an optical system. The projection light emission unit has a display surface with a first region and a second region arranged in an x direction. The first optical element reflects first projection light from the first region. The second optical element reflects the first projection light reflected by the first optical element and transmits second projection light from the second region. The optical system projects the first and the second projection light. The first direction corresponds to a direction in which both eyes are aligned when the first projection light and the second projection light are projected into the user's field of view. The display surface includes subpixels constituting one pixel arranged in the first direction and subpixels constituting different pixels in a second direction that intersects the first direction.

15 Claims, 14 Drawing Sheets

(51) Int. Cl.
*B60K 35/00* (2006.01)
*G02B 27/01* (2006.01)
*G02B 30/30* (2020.01)

(52) U.S. Cl.
CPC ............ *G02B 30/22* (2020.01); *G02B 30/30* (2020.01); *B60K 2370/1529* (2019.05); *G02B 2027/0134* (2013.01)

(58) Field of Classification Search
CPC ............ G02B 30/30; G02B 27/0101; G02B 2027/0134; G02B 27/01; B60K 35/00; B60K 2370/1529; H04N 13/31; H04N 13/317; H04N 13/346; H04N 13/366
USPC .................. 359/462, 464, 633, 629, 466
See application file for complete search history.

(56) References Cited

U.S. PATENT DOCUMENTS

| | | |
|---|---|---|
| 2013/0265646 A1 | 10/2013 | Sakai |
| 2015/0253487 A1 | 9/2015 | Nichol et al. |
| 2017/0031162 A1 | 2/2017 | Konishi et al. |
| 2017/0336628 A1* | 11/2017 | Kim ..................... G02B 5/30 |

FOREIGN PATENT DOCUMENTS

| | | | |
|---|---|---|---|
| JP | 2015-125407 A | 7/2015 | |
| JP | 6004706 B2 | 10/2016 | |
| JP | 2017-030737 A | 2/2017 | |
| KR | 10-2014-0067906 A | 6/2014 | |
| WO | 2015/168464 A1 | 11/2015 | |
| WO | WO-2015168464 A1 * | 11/2015 | ............... B60R 1/00 |

\* cited by examiner

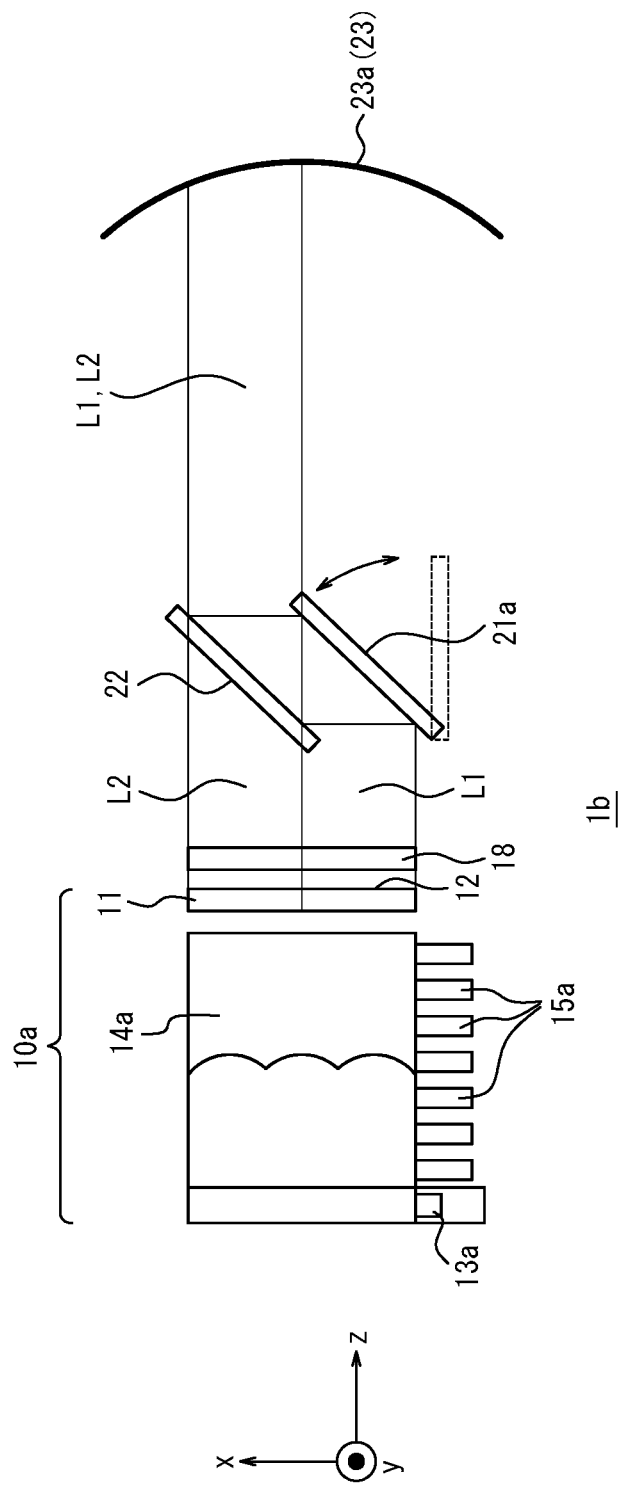

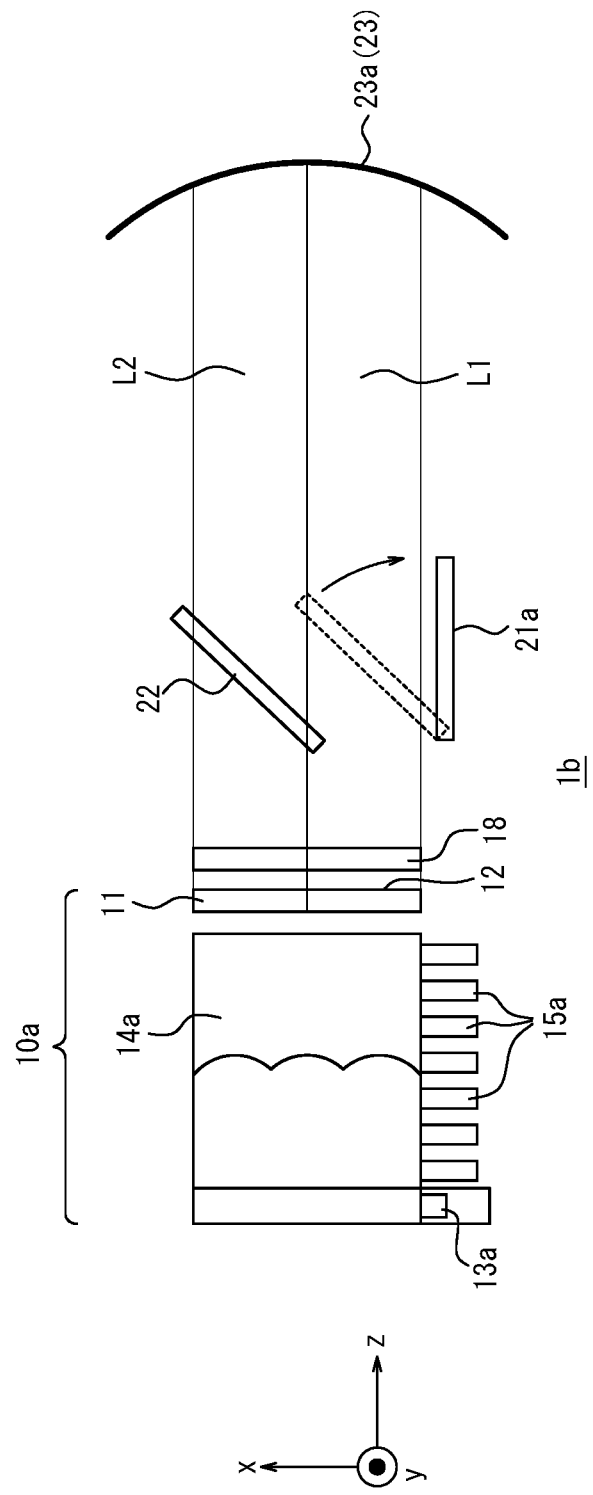

IMAGE PROJECTION APPARATUS AND MOBILE BODY

CROSS REFERENCE TO RELATED APPLICATION

This application claims priority to and the benefit of Japanese Patent Application No. 2017-134113 filed on Jul. 7, 2017, the entire contents of which are incorporated herein by reference.

TECHNICAL FIELD

The present disclosure relates to an image projection apparatus and a mobile body.

BACKGROUND

Image projection apparatuses in which a display is divided into two areas and light emitted from each of the two areas is superimposed and projected into a field of view of a user to display two virtual images with different imaging distances with respect to the user are known (e.g., see PTL 1).

CITATION LIST

Patent Literature

PTL 1: Japanese Patent No. 6004706

SUMMARY

An image projection apparatus according to the present disclosure includes a projection light emission unit, a first optical element, a second optical element, and an optical system. The projection light emission unit includes a display surface in which a first region and a second region are arranged in a first direction. The first optical element reflects first projection light from the first region. The second optical element reflects the first projection light reflected by the first optical element and transmits second projection light from the second region. The optical system projects the first projection light reflected by the second optical element and the second projection light transmitted by the second optical element to a field of view of a user. The first direction corresponds to a direction in which eyes of the user are aligned when the first projection light and the second projection light are projected into the field of view of the user. The display surface includes subpixels that constitute one pixel and are aligned in the first direction and subpixels that constitute different pixels in a second direction that intersects the first direction.

A mobile body according to the present disclosure includes an image projection apparatus. The image projection apparatus includes a projection light emission unit, a first optical element, a second optical element, and an optical system. The projection light emission unit includes a display surface in which a first region and a second region are arranged in a first direction. The first optical element reflects first projection light from the first region. The second optical element reflects the first projection light reflected by the first optical element and transmits second projection light from the second region. The optical system projects the first projection light reflected by the second optical element and the second projection light transmitted by the second optical element to a field of view of a user. The first direction corresponds to a direction in which eyes of the user are aligned when the first projection light and the second projection light are projected into the field of view of the user. The display surface includes subpixels that constitute one pixel and are aligned in the first direction and subpixels that constitute different pixels in a second direction that intersects the first direction. The optical system includes a windshield or a combiner that reflects the first projection light and the second projection light toward an eye box of a user.

BRIEF DESCRIPTION OF THE DRAWINGS

In the accompanying drawings:

FIG. 13 is a diagram illustrating an image projection apparatus according to a third embodiment; and FIG. 14 is a diagram illustrating a state in which a first optical element of the image projection apparatus of FIG. 13 is rotated.

DETAILED DESCRIPTION

Preferably, an image projection apparatus displays an image at a high resolution. However, conventional image projection apparatuses may project images in a low resolution in the horizontal direction.

An image projection apparatus according to the present disclosure can display two screens having different imaging distances aligned in a forward direction while reducing a deterioration in resolution.

Hereinafter, embodiments of the present disclosure will be described with reference to the accompanying drawings. Note that the figures used in the following description are schematically illustrated. The drawings may not necessarily be drawn to scale.

First Embodiment

Figure 1:
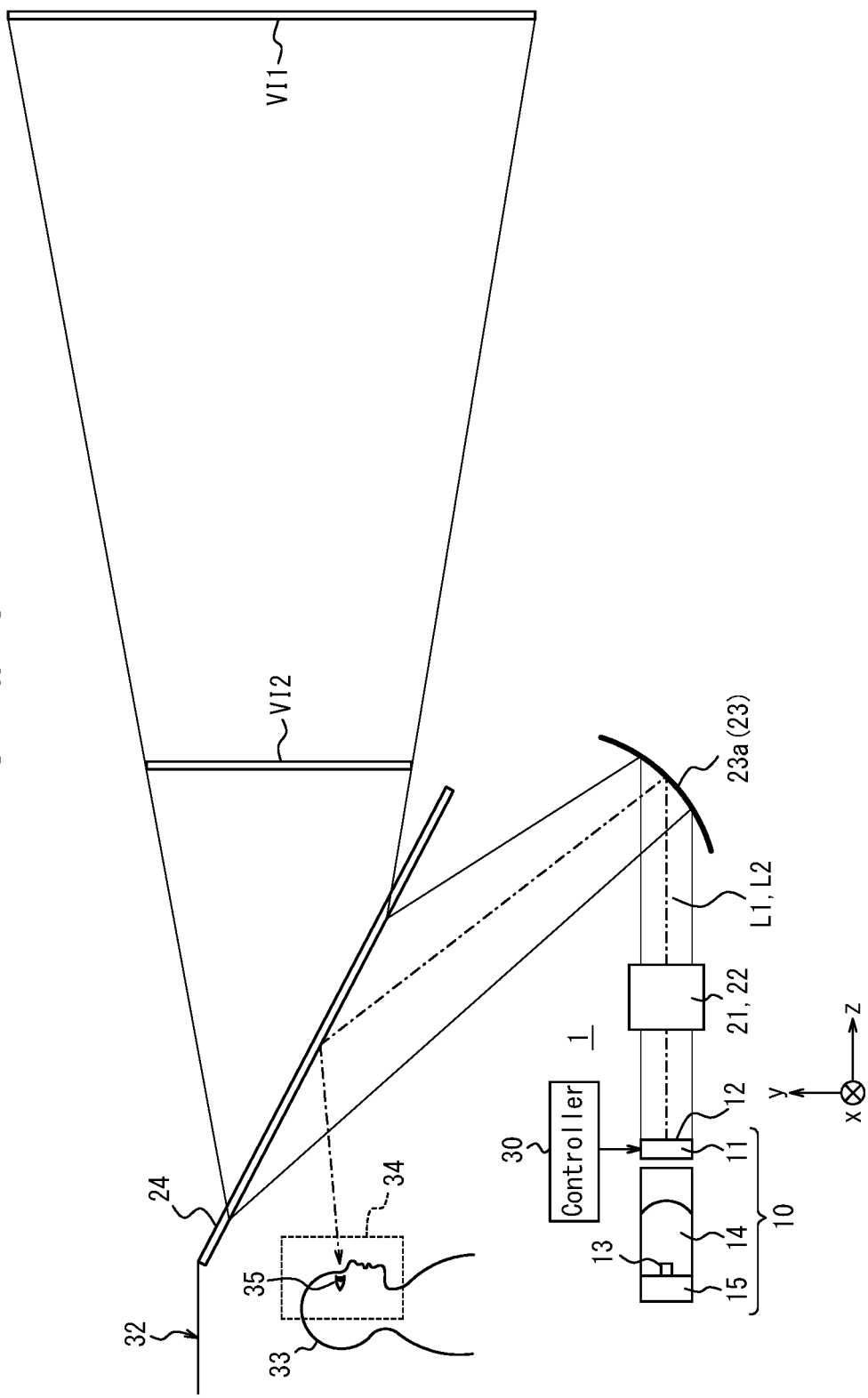
FIG. 1 is a diagram illustrating an image projection apparatus according to an embodiment of the present disclosure.
Figure 2:
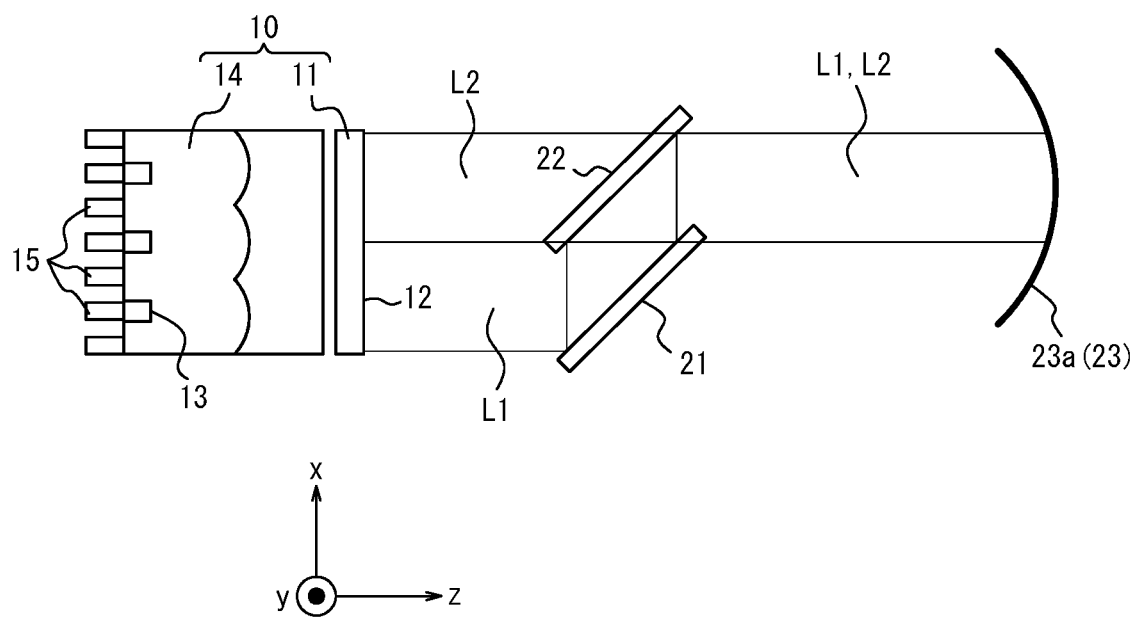
FIG. 2 is a diagram illustrating the image projection apparatus of FIG. 1 viewed from a y direction.

An image projection apparatus 1 according to a first embodiment of the present disclosure includes a projection light emission unit 10, a first optical element 21, a second optical element 22, and an optical system 23 that includes a concave mirror 23a, as illustrated in FIG. 1 and FIG. 2. The projection light emission unit 10 includes a display 11 that has a display surface 12 and an illumination unit 14 that includes a light source 13. The illumination unit 14 includes a radiation fin 15 for radiating heat from the light source 13.

The display 11 may include, for example, a transmitting liquid crystal device such as LCD (Liquid Crystal Display) or a reflecting liquid crystal device such as LCOS (Liquid Crystal On Silicon). In this case, the display surface 12 may be a display surface of a liquid crystal device. The display 11 is not limited to the liquid crystal device. A variety of flat panel displays, such as an organic EL (Electroluminescence) display, an inorganic EL display, a plasma display (PDP: Plasma Display Panel), a field emission display (FED: Field Emission Display), an electrophoretic display, or a twisting ball display, may be employed as the display 11. When a self-luminous display panel such as the organic EL display is employed, the illumination unit 4 may be omitted.

The display 11 may include a mirror device such as a digital mirror device (DMD: Digital Mirror Device) or a MEMS (Micro Electro Mechanical Systems) mirror. In this case, the display surface 12 may be an array surface of the mirror. The display 11 may further include a screen, a lens array or the like that images light emitted from the mirror device. In this case, the display surface 12 may be configured as a screen or an imaging surface of the lens array.

An image displayed on the display surface 12 is emitted as projection light. Projection light emitted from the display surface 12 is projected into a field of view of a user 33 and displays a virtual image, as will be described later. Hereinafter, a direction on the display surface 12 corresponding to a direction in which the eyes 35 of the user 33 are aligned will be referred to as an x direction. The x direction will also be referred to as a first direction. A direction that intersects the x direction on the display surface 12 will be referred to as a y direction. The y direction may be orthogonal to the x direction. The y direction will also be referred to as a second direction. Further, a direction normal to the display surface 12 will be referred to as a z direction. The image projection apparatus 1 may be mounted in a mobile body 32. The user 33 may be a person in the mobile body 32. The user 33 may be a driver who is driving the mobile body 32.

The illumination unit 14 may include a lamp, an LED (Light Emission Diode), or a laser that serves as the light source 13 for irradiating the display surface 12. The illumination unit 14 may be used as a backlight of a liquid crystal device. The illumination unit 14 may include a plurality of LEDs arranged in a two-dimensional manner on the rear side of the display surface 12 opposing the display surface 12. The backlight having a plurality of LEDs arranged on the rear side of the display surface 12 opposing the display surface 12 may be referred to as a direct backlight. The illumination unit 14 may include a plurality of LEDs arranged on any one of the edges of the display 11 and guide light to the entire rear surface of the display surface 12 using a light guide plate. A backlight having a plurality of LEDs arranged on edges of the display 11 may be referred to as a side backlight. The illumination unit 14 may include a lens array, a light guide plate, a diffusion plate, and the like in order to uniformly irradiate the display surface 12 with light emitted from the light source 13. When the display 11 is configured as a mirror device, the light source 13 may be used to emit light that is incident on the mirror device.

The radiation fin 15 is arranged adjacent to the light source 13 of the illumination unit 14. The radiation fin 15 has a plurality of projections for radiating heat generated by the light source 13. Each of the projections may have a plate-like shape or a rod-like shape. The radiation fin 15 may be formed from a metal such as aluminum. The radiation fin 15 may also be referred to as a heat sink.

Figure 3:
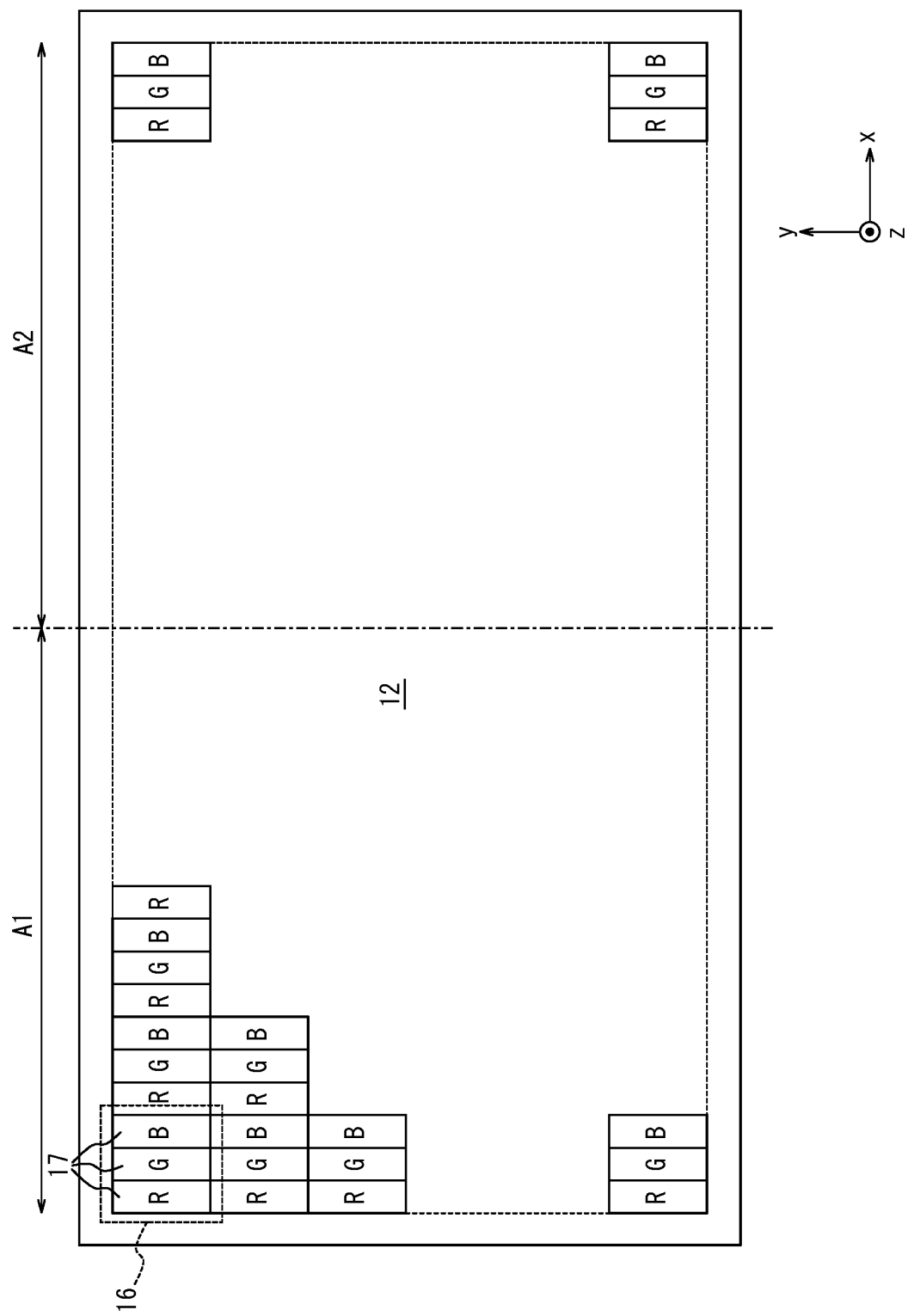
FIG. 3 is a diagram for explaining an arrangement of pixels in a display surface of FIG. 1.

Pixels 16 are arranged in a grid pattern in the x direction and the y direction in a repetitive manner on the display surface 12, as illustrated in FIG. 3. Each of the pixels 16 may include three subpixels 17. Each of the subpixels 17 corresponds to one of the colors R (Red), G (Green), and B (Blue). A combination of three subpixels 17 for displaying R, G, and B, respectively, may constitute one pixel 16 (one image element). One subpixel 17 has a rectangular shape extending in the y direction. A subpixel 17 may have a width corresponding to ⅓ of the width of one pixel. A group of subpixels 17 arranged in the x direction may constitute a pixel 16 having an approximate square shape. In the display surface 12, subpixels 17 constituting one pixel 16 are arranged in the x direction, and subpixels 17 constituting different pixels 16 are arranged in the y direction that intersects the x direction.

The display surface 12 of the display 11 includes two regions: a first region A1 and a second region A2 which are arranged along the x direction. In other words, the display surface 12 of the display 11 is divided into the first region A1 and the second region A2 by a virtual border line extending in the y direction. The virtual border line is indicated by a dashed line in FIG. 3. The first region A1 and the second region A2 have the same arrangements of the pixels 16 and the subpixels 17. The area of the first region A1 and the area of the second region A2 may be equal to or different from each other. Projection light emitted from the first region A1 will be referred to as first projection light L1. Projection light emitted from the second region A2 will be referred to as second projection light L2.

FIG. 2 is a diagram illustrating the projection light emission unit 10, the first optical element 21, the second optical element 22, and the concave mirror 23a of the image projection apparatus 1 viewed in the y direction. The first optical element 21 is arranged on an optical path of the first projection light L1 emitted from the display surface 12 of the display 11, and the second optical element 22 is arranged on an optical path of the second projection light L2 emitted from the display surface 12 of the display 11, as illustrated in FIG. 2.

The first optical element 21 reflects at least a portion of the first projection light L1 emitted from the display surface 12 of the display 11 toward the second optical element 22. The first optical element 21 and the second optical element 22 may be arranged side by side in the x direction. The first optical element 21 can reflect the first projection light L1 in an approximately x direction. The first optical element 21 may be configured as a mirror for reflecting the first projection light L1 from the first region A1 of the display surface 12. The first optical element 21 may be configured as a reflecting prism for deflecting the first projection light L1.

The second optical element 22 reflects at least a portion of the first projection light L1 reflected by the first optical element 21 toward the concave mirror 23a. The second optical element 22 transmits at least a portion of the second projection light L2 emitted from the second region A2 of the display surface 12 toward the concave mirror 23a. The second optical element 22 may be configured as a beam splitter or a half mirror.

The first projection light L1 reflected by the second optical element 22 and the second projection light L2 transmitted by the second optical element 22 are incident on the concave mirror 23a in a manner at least partially overlapping with each other. The concave mirror 23a is included in the optical system 23 of the image projection apparatus 1. The optical system 23 of the image projection apparatus 1 is not limited to configurations that include the concave mirror 23a. The optical system 23 may have a configuration that includes a combination of a convex lens and a flat mirror, or a combination of a plurality of mirrors including the convex mirror 23a. Positive refractive power of the constituent elements of the optical system 23 visibly projects a virtual image into the field of view of the user 33, as will be described later.

As described above, the image projection apparatus 1 can be mounted in the mobile body 32. The image projection apparatus 1 may be provided to something other than the mobile body 32. The image projection apparatus 1 of FIG. 1 is assumed to be mounted in the mobile body 32 configured as a vehicle. The image projection apparatus 1 may be configured as a head-up display (HUD: Head Up Display). The projection light emission unit 10, the first optical element 21, the second optical element 22, and the concave mirror 23a of the image projection apparatus 1 may be incorporated into the instrument panel of the mobile body 32 configured as a vehicle.

The optical system 23 of the image projection apparatus 1 may include a windshield 24 of the mobile body 32. An opening through which the first projection light L1 and the second projection beam L2 can pass is formed between the concave mirror 23a and the windshield 24. The first projection light L1 and the second projection light L2 may be reflected by the windshield 24 via the concave mirror 23a toward an eye box 34 of the user 33 and may enter the eyes 35 of the user 33. Each of the optical paths of the first projection light L1 and the second optical light L2 reflected by the windshield 24 and traveling toward the eyes 35 of the user 33 is indicated by a dashed line arrow in FIG. 1. FIG. 1 illustrates an optical path of virtual projection light between a first virtual image VI1 and a second virtual image VI2 seen by the user 33 and the windshield 24 on the front side of the windshield 24. A combiner independent of the windshield 24 may be used in place of the windshield 24. The combiner is a semitransparent plate-like member for reflecting projection light. The combiner may be configured as a half mirror. The eye box 34 is a region in real space in which it is assumed that the eyes 35 of the user 33 are positioned, in consideration of, for example, build, posture, and changes in the posture of the user 33. The eye box 34 may have any appropriate shape. The eye box 34 may include a planar or three-dimensional region. When the eyes 35 are positioned in the eye box 34, the user 33 can see the virtual images VI1 and VI2 formed by the projection light that has reached the eye box 34.

The display 11 can generate an image upon receiving a signal from a controller 30. The image projection apparatus 1 may include the controller 30. The controller 30 can control the image projection apparatus 1 in its entirety. The controller 30 controls the intensities of the first projection light L1 and the second projection light L2 emitted by the projection light emission unit 10. The controller 30 may output, for example, control information used for controlling the intensity of projection light in respect of the light source 13. The display 11 may receive a signal for an image to be displayed from an external member rather than the controller 30 and generate an image based on the signal.

The controller 30 includes one or more processors. The controller 30 or the processor may include one or more memories for storing programs for various operations and information during calculation. The memory includes a volatile memory or a non-volatile memory. The memory includes a memory independent of the processor or a memory incorporated in the processor. The processor includes a general-purpose processor for reading a particular program and performing a particular function, or a specialized processor dedicated for a particular processing. The specialized processor includes an application-specific integrated circuit (ASIC: Application Specific Integrated Circuit). The processor includes a programmable logic device (PLD: Programmable Logic Device). The PLD includes an FPGA (Field-Programmable Gate Array). The controller 30 may be configured as a SoC (System-on-a-Chip) or a SiP (System In a Package) in which one or more processors cooperate.

In the above configuration, during the use of the image projection apparatus 1, an image displayed in the first region A1 of the display surface 12 of the display 11 is emitted as the first projection light L1. An image displayed in the second display region A2 of the display surface 12 of the display 11 is emitted as the second projection light L2. The first projection light L1 is reflected by the first optical element 21 and then by the second optical element 22, and travels toward the concave mirror 23a. The second projection light L2 transmits through the second optical element 22 and travels toward the concave mirror 23a. Thus, the first projection light L1 has a longer optical path than the second projection light L2. The first projection light L1 and the second projection light L2 reflected by the concave mirror 23a are reflected by the windshield 41 and form the first virtual image VI1 and the second virtual image VI2, respectively. The first virtual image VI1 is a virtual image formed on a far side within the field of view of the user 33, and the second virtual image VI2 is a virtual image formed on a near side.

By virtue of the difference between the optical path of the first projection light L1 and the optical path of the second projection light L2, the first virtual image VI1 and the second virtual image VI2 are imaged at different locations in the forward direction. Thus, the image projection apparatus 1 can project two virtual images having different imaging distances to be seen by the user 33. Note that the "forward direction" is the direction of the normal line of sight of the user 33. For the mobile body 32, the "forward direction" refers to the front side through the windshield 24 from the user 33. For the mobile body 32, the "forward direction" corresponds to a traveling direction of the mobile body 32 during normal movement. Further, the direction opposite to the "forward direction" will be referred to as "rearward direction" or "backward direction".

The first virtual image VI1 and the second virtual image VI2 are formed by images from subpixels 17 that are arranged in the x direction and constitute one pixel 16 and images from subpixels 17 that are arranged in the y direction and constitute different pixels 16, in a manner similar to the arrangement of the subpixels 17 in the display surface 12 of FIG. 3. A pixel 16 may have an approximately square shape, as described above. Accordingly, the aspect ratio of an image from the subpixels 17 seen by the user 33 is approximately 3:1. The vertical direction corresponds to the y direction. The horizontal direction corresponds to the x direction.

Thus, pixels are more densely arranged in the x direction in the first virtual image VI1 and the second virtual image VI2 seen by the user 33. In other words, the resolutions of the first virtual image VI1 and the second virtual image VI2 are high in the x-direction. Here, in an image that is seen by the user 33, a direction in which the eyes 35 of the user 33 are aligned is assumed to be the x-direction, and a direction perpendicular thereto is assumed to be the y-direction. The x direction can be rephrased as the horizontal direction. The y direction can be rephrased as the vertical direction.

Figure 4:
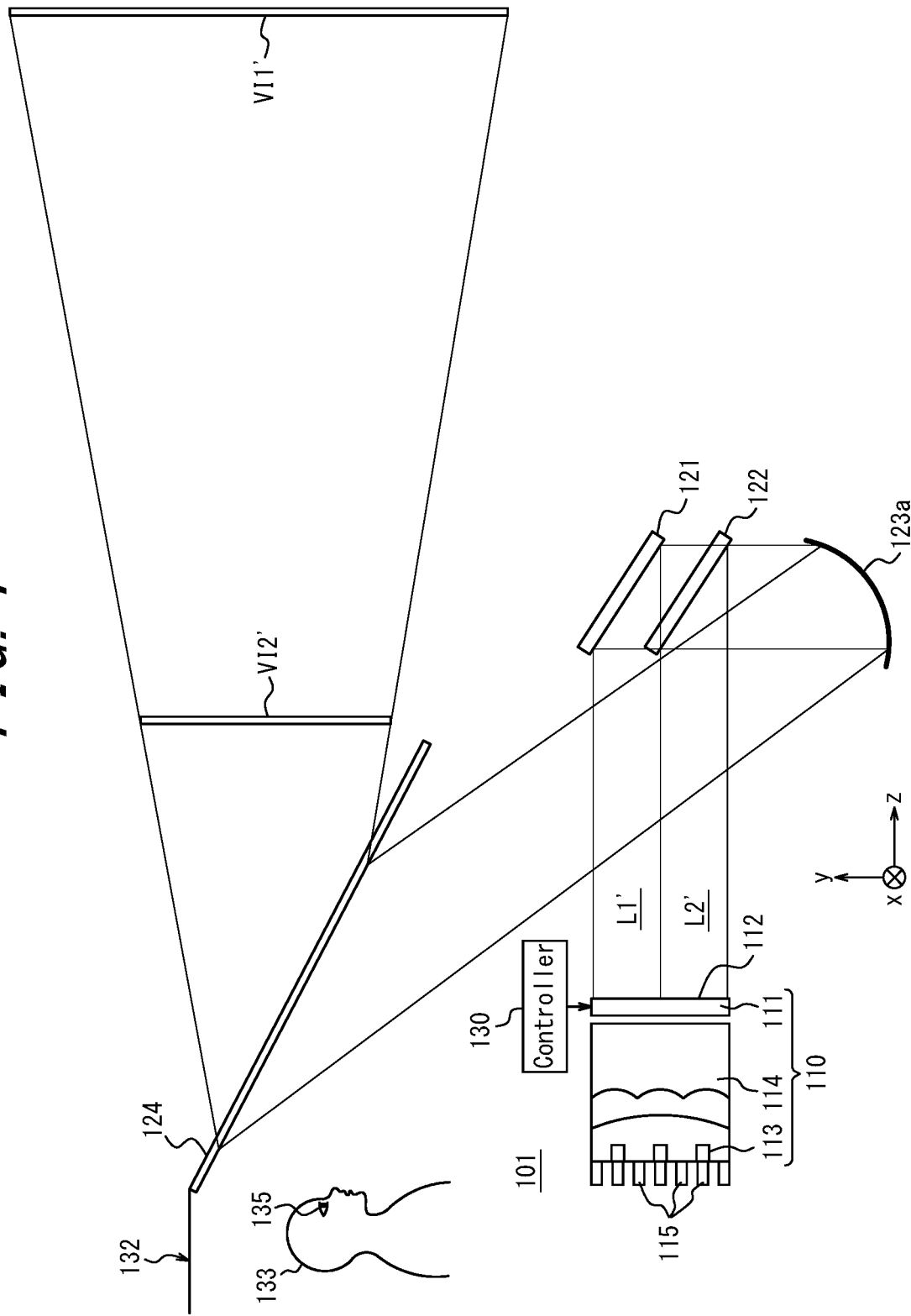
FIG. 4 is a diagram illustrating an example of a conventional image projection apparatus.
Figure 5:
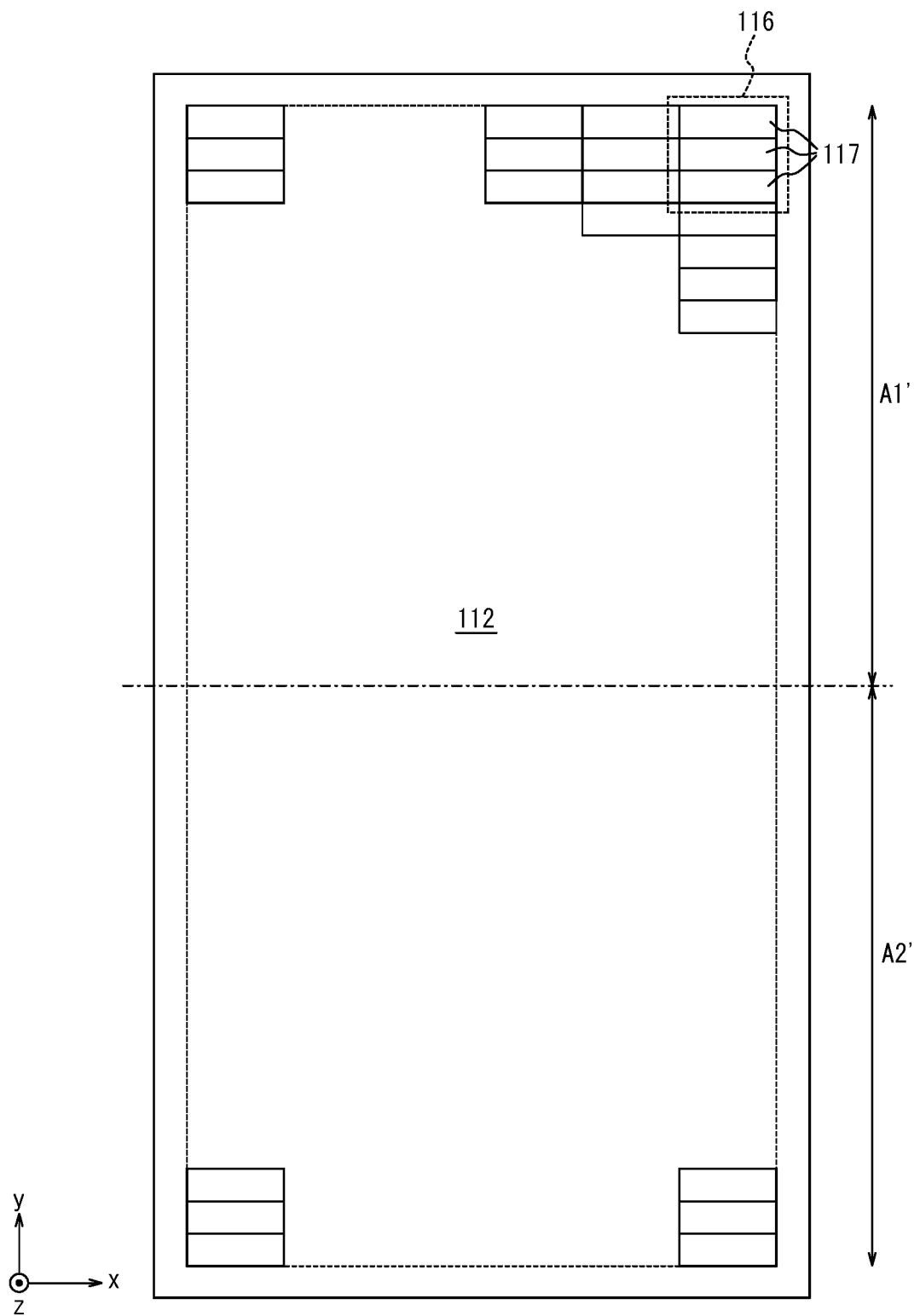
FIG. 5 is a diagram for explaining an arrangement of pixels in a display surface of FIG. 4.

FIG. 4 illustrates an example configuration of a conventional image projection apparatus 101 used herein as a comparison. The constituent elements illustrated in FIG. 4 corresponding to those of the image projection apparatus 1 according to the embodiment illustrated in FIG. 1 and FIG. 2 are denoted by reference signs in which 100 is added to the reference signs of the constituent elements of the image projection apparatus 1. Each of the constituent elements of the image projection apparatus 101 may be configured in a manner similar to a corresponding constituent element of the image projection apparatus 1, unless otherwise noted. In the image projection apparatus 101, a first region A1' corresponding to a first virtual image VI1' serving as a virtual image formed on the far side and a second region AZ corresponding to a second virtual image VI2' serving as a virtual image formed on the near side are arranged in the y direction, as illustrated in FIG. 5. Subpixels 117 constituting one pixel 116 are arranged in the y direction and subpixels 117 constituting different pixels 116 are arranged in the x direction in the display surface 112.

In the image projection apparatus 101, a first optical element 121 configured as a mirror and a second optical element 122 configured as a half mirror are arranged so as to deflect first projection light L1' and second projection light L2', respectively, toward a concave mirror 123a. At least a portion of the first projection light L1' emitted from the first region A1' of the display surface 112 is reflected by the first optical element 121, transmitted by the second optical element 122, and then travels toward the concave mirror 123a. Also, at least a portion of the second projection light L2' emitted from the second region A2' of the display surface 112 is reflected by the second optical element 122 and then travels toward the concave mirror 123a.

The first projection light L1' and the second projection light L2' are reflected by the concave mirror 123a and then by the windshield 124 and form the first virtual image VI1' and the second virtual image VI2', respectively, within a field of view of a user 133.

In the conventional image projection apparatus 101, the aspect ratio of the subpixels 117 is 1:3, which is different from the image projection apparatus 1 of the present disclosure. That is, the subpixels 117 arranged in the direction in which eyes 135 of the user 133 are aligned have low resolution. This makes the user 133 feel that the first virtual image VI1' and the second virtual image VI2' displayed by the image projection apparatus 101 are coarse. In the image projection apparatus 1 according to the present disclosure, on the other hand, an image has a high resolution in the x direction in which the eyes 35 of the user 33 are aligned. Thus, an image presented to the user 33 can appear to be a fine image. That is, the image projection apparatus 1 of the present disclosure can display two screens at different imaging distances in the forward direction, while reducing a decrease in the resolution perceived by the user.

Figure 6:
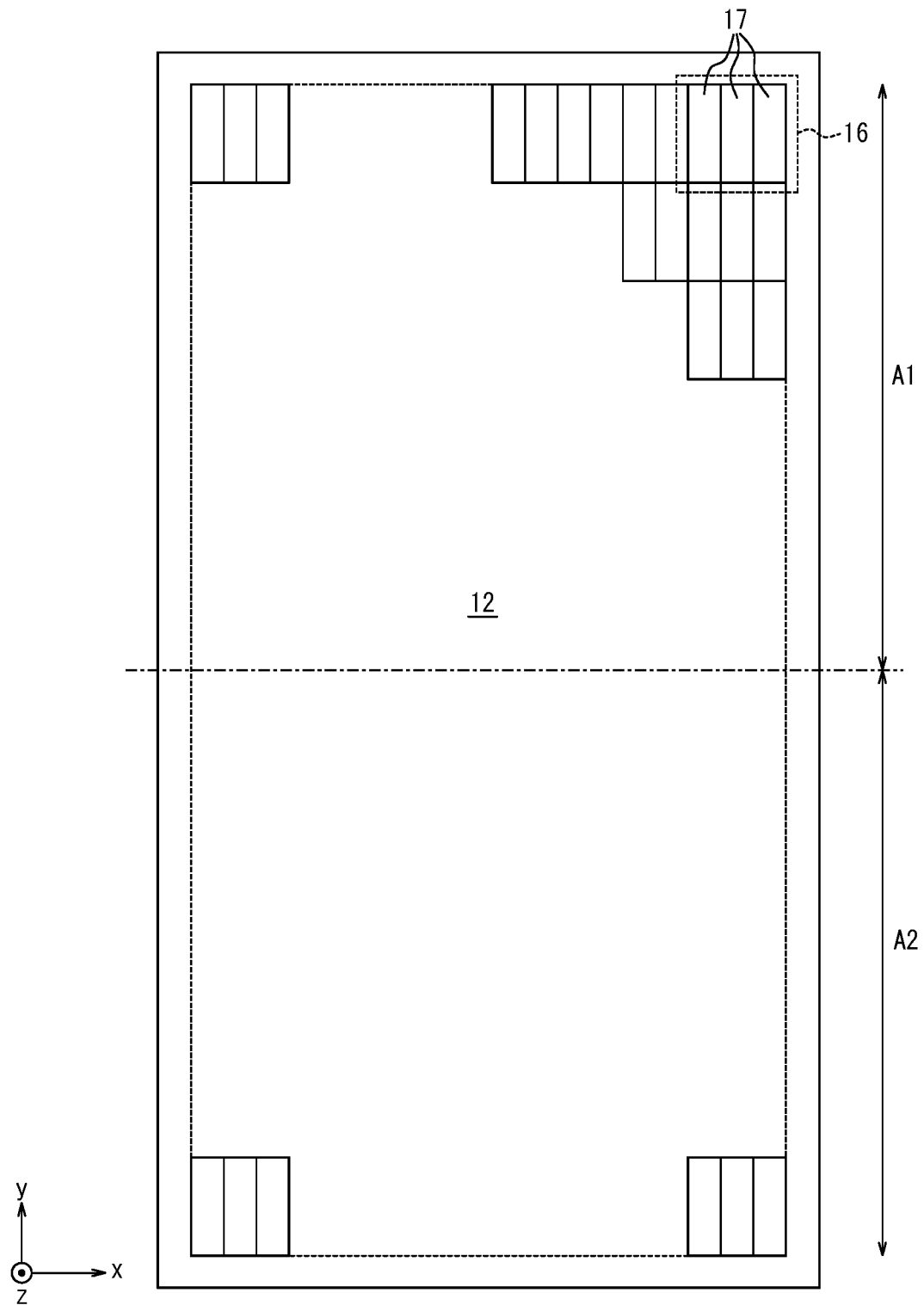
FIG. 6 is a diagram for explaining an arrangement of pixels in a display surface of an image projection apparatus according to an example variation.

An image projection apparatus according to an example variation of the first embodiment of the present disclosure may employ a display 11 having the display surface 12 illustrated in FIG. 6. In the display surface 12, the first area A1 corresponding to the first virtual image VI1 and the second area A2 corresponding to the second virtual image VI2 are arranged in the y direction. In general, subpixels constituting one pixel in the conventional display apparatus are arranged in a direction along a longitudinal side of a rectangular display surface. In the present example variation, on the other hand, the subpixels 17 constituting one pixel 16 are arranged in the x direction, which is the transverse direction, and the subpixels 17 constituting different pixels 16 are arranged in the y direction, which is the longitudinal direction, in the display surface 12. By configuring an image projection apparatus in a manner similar to the image projection apparatus 101 of FIG. 4 and employing the display 11 having the display surface 12 of FIG. 6, a virtual image can be displayed having a resolution higher in the x direction than in the y-direction.

Second Embodiment

Figure 7:
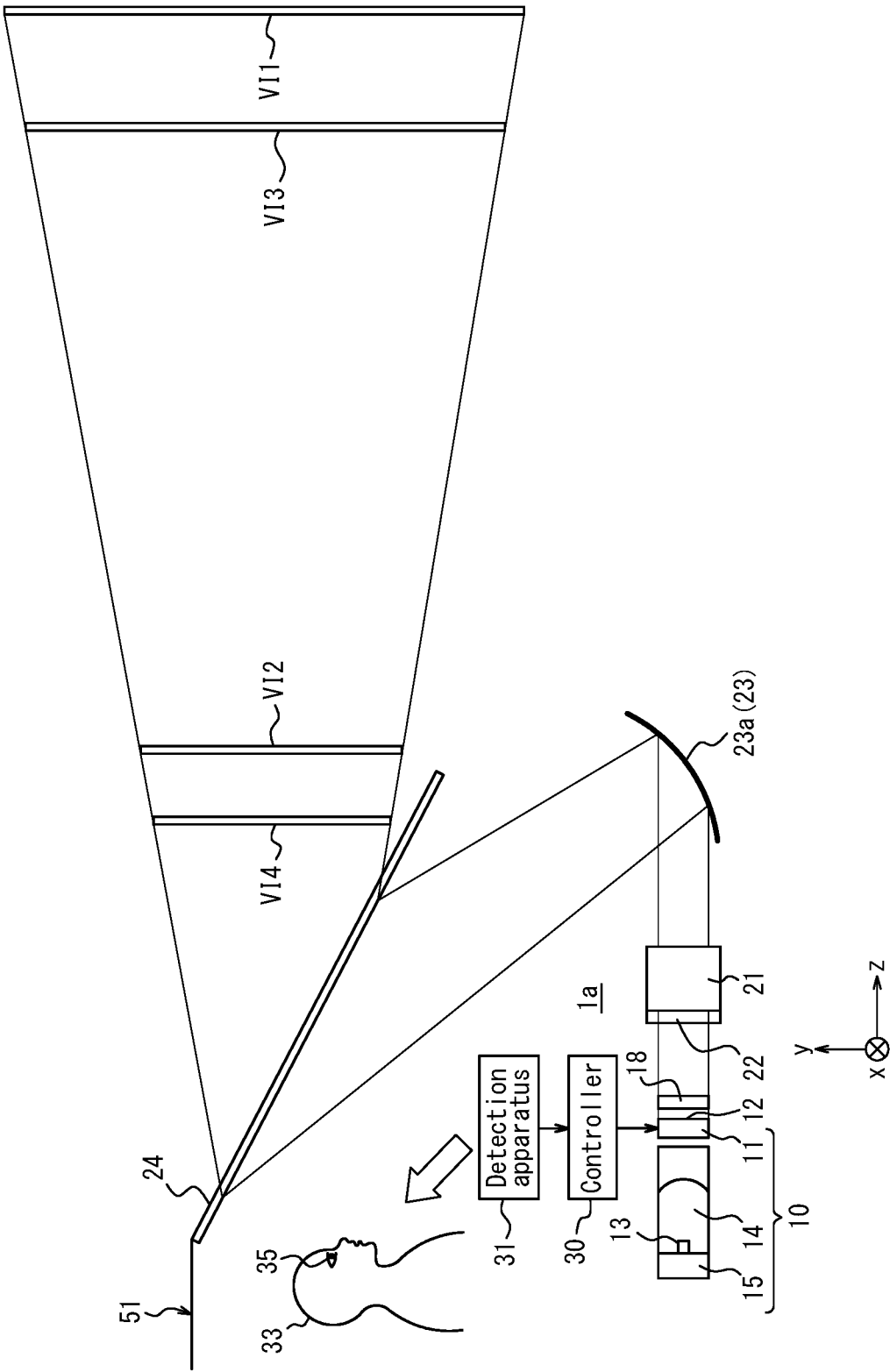
FIG. 7 is a diagram illustrating an image projection apparatus according to a second embodiment of the present disclosure.

An image projection apparatus 1a according to a second embodiment of the present disclosure will be described with reference to FIG. 7. The image projection apparatus 1a of FIG. 7 performs three-dimensional image display by projecting images having a parallax therebetween to a left eye 35L and a right eye 35R of the user 33. Hereinafter, an image stereoscopically displayed due to parallax will be referred to as a stereoscopic image. In the following description, aspects different from the image projection apparatus 1 according to the first embodiment will be described. The constituent elements which are the same as or corresponding to those of the first embodiment will be denoted by the same reference signs, and descriptions thereof will be omitted.

An image projection apparatus 1a according to the second embodiment includes a third optical element 18 between the first optical element 21 and the second optical element 22 and the display 11 in the configuration of the image projection apparatus 1 according to the first embodiment. The image projection apparatus 1a also includes a detection apparatus 31 configured to detect a position of the eyes 35 or the head of the user 33.

The third optical element 18 is an optical element which defines a beam direction of projection light emitted from each of the subpixels 17. The third optical element 18 is configured as, for example, a parallax barrier or a lenticular lens. The third optical element 18 defines the direction of projection light such that projection light from the subpixels 17 of the display surface 12 for displaying an image for the right eye 35R is projected to the right eye 35R, and projection light from the subpixels 17 for displaying an image for the left eye 35L is projected to the left eye 35L. The third optical element 18 may be arranged on the exit side of projection light of the display 11 (the positive z direction in the figure) at a predetermined distance from the display 11, as illustrated in FIG. 7. The third optical element 18 may be arranged on the same side as the illumination unit 14 with respect to the display 11. The display surface 12 and the third optical element 18 are arranged to be parallel with each other. A space between the display surface 12 and the third optical element 18 may be referred to as a gap, as appropriate.

Figure 8:
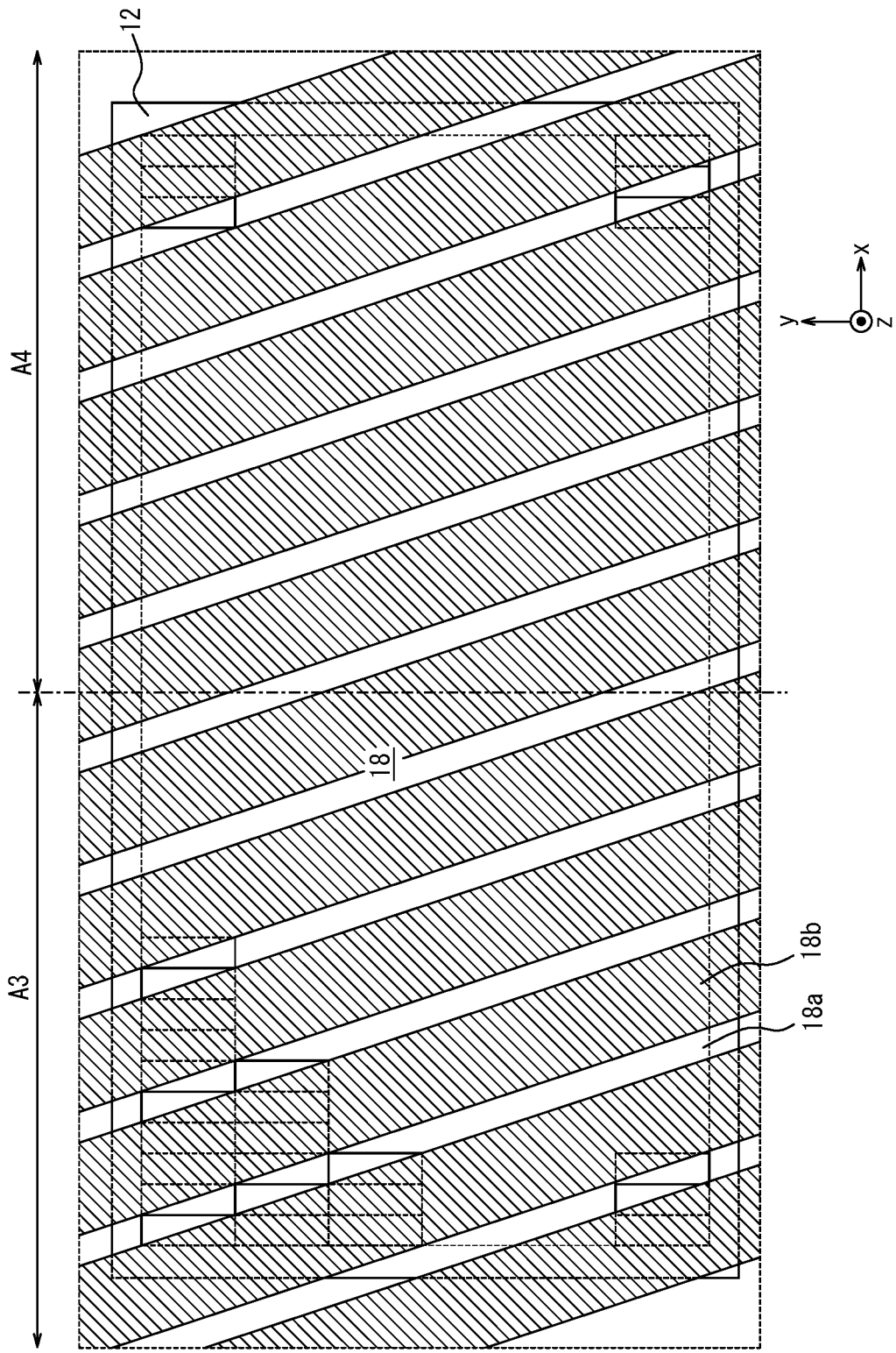
FIG. 8 is a diagram illustrating a display and a third optical element of FIG. 7 viewed from a user side.

FIG. 8 is a diagram illustrating the third optical element 18 and the display surface 12 viewed from the side of the display surface 12 in a case in which the third optical element 18 is arranged on the exit side of the projection light of the display 11. As illustrated in FIG. 8, the third optical element 18 serving as a parallax barrier includes a plurality of light transmitting regions 18a for transmitting projection light and a plurality of light shielding regions 18b for blocking projection light. The light transmitting regions 18a and the shielding regions 18b are alternately arranged. The light transmitting regions 18a and the light shielding regions 18b are a plurality of band-like regions extending in a predetermined direction in the xy plane. The predetermined direction may be a direction along a diagonal of the subpixels 17. In a case in which the light transmitting regions 18a and the light shielding regions 18b extend in the y direction in which the subpixels 17 are arranged in the display surface 12, a moiré pattern may occur between an aperture pattern of the third optical element 18 and a pixel pattern displayed on the display 11. By inclining the extending direction of the light transmitting regions 18a and the light shielding regions 18b with respect to the y direction, occurrence of a moiré pattern is reduced in a projected image. However, this does not exclude the configuration in which the light transmitting regions 18a and the light shielding regions 18b extend in the y-direction.

The light transmitting regions 18a have a higher light transmittance than the light shielding regions 18b. The light transmitting regions 18a may transmit light at a transmittance of a predetermined value or more. The predetermined value may be, for example, 100% or less. The light shielding regions 18b are regions for blocking a portion of light incident on the third optical element 18 that corresponds to the light shielding regions 18b. In other words, the light shielding regions 18b block the optical path of projection light to be displayed in the display surface 12. The light shielding regions 18b may block light at a predetermined value of transmittance or less. The predetermined value may be, for example, 0% or a value larger than 0% and close thereto.

The third optical element 18 defines a beam direction as a propagation direction of projection light emitted from each of the subpixels 17 for each of the transmitting regions 18a formed as a plurality of band-like regions extending in the predetermined direction in the xy plane. By defining the direction of projection light emitted from the subpixels 17 using the third optical element 18, regions of the display surface 12 visible to the eyes 35 of the user 33 are determined. Hereinafter, these regions will be referred to as visible regions 12a. A region of the display surface 12 visible to the left eye 35L of the user 33 will be referred to as a left eye visible region 12aL. A region of the display surface 12 visible to the right eye 35R of the user 33 will be referred to as a right eye visible region 12aR.

The third optical element 18 may be configured as a film or a plate-like member. In this case, the light shielding regions 18b may be configured as the film or the plate-like member. The light transmitting regions 18a may be configured as openings formed in the film or the plate-like member. The plate-like member and the film may be made of a resin or any appropriate material. The third optical element 18 may be configured as another member, rather than a film or a plate-like member. The third optical element 18 may include a substrate having a light-shielding property or a light-shielding additive added thereto. The third optical element 18 may include a substrate made of glass or the like having high light transmittance and a light shielding film formed thereon serving as the light shielding regions 18b.

The third optical element 18 may be configured as a lenticular lens or a liquid crystal shutter, rather than a parallax barrier. In a case in which the third optical element 18 is configured as a lenticular lens, the lenticular lens includes cylindrical lenses arranged in the xy plane. The lenticular lens is arranged in a manner similar to the parallax barrier, such that projection light from the subpixels 17 for displaying an image to be seen by the right eye 35R is projected to the right eye 35R and projection light from the subpixels 17 for displaying an image to be seen by the left eye 35L is projected to the left eye 35L. The lenticular lens may be arranged in a manner inclined with respect to the y direction.

When the third optical element 18 is configured as a liquid crystal shutter, the liquid crystal shutter can control light transmittance in accordance with an applied voltage. The liquid crystal shutter may include a plurality of pixels and control the light transmittance of each of the pixels. The liquid crystal shutter may form a high light-transmittance region or a low light-transmittance region in any shape. The third optical element 18 configured as the liquid crystal shutter may be controlled by the controller 30. Configuring the third optical element 18 using the liquid crystal shutter enables the controller 30 to dynamically change the light transmitting region 18a.

The third optical element 18 has a third region A3 and a fourth region A4 opposing the first region A1 and second region A2 of the display surface 12, respectively.

The detection apparatus 31 detects positions of the left eye 35L and the right eye 35R of the user 33 and outputs the positions to the controller 30. The detection apparatus 31 may include a camera provided with, for example, a CCD (Charge Coupled Device) image sensor or a CMOS (Complementary Metal Oxide Semiconductor) image sensor. An imaging range of the detection apparatus 31 provided with a camera includes at least the eye box 34. The detection apparatus 31 may capture an image of the face of the user 33 using the camera. The detection apparatus 31 may detect the positions of the left eye 35L and the right eye 35R from an image captured by the camera that includes the face of the user 33. The detection apparatus 31 may detect the positions of the left eye 35L and the right eye 35R as coordinates in a three-dimensional space based on an image captured by one camera. The detection apparatus 31 may detect the positions of the left eye 35L and the right eye 35R as the coordinates in a three-dimensional space based on images captured by two or more cameras.

The detection apparatus 31 does not need to include a camera and can be connected to an external camera. The detection apparatus 31 may include an input terminal for receiving a signal input from the external camera. The external camera may be directly connected to the input terminal. The external camera may be indirectly connected to the input terminal via a common network. The detection apparatus 31 which does not include a camera may include an input terminal through which the camera inputs an image signal. The detection apparatus 31 which does not include a camera may detect positions of the left eye 35L and the right eye 35R based on the image signal input to the input terminal.

The detection apparatus 31 may include, for example, a sensor. The sensor may be an ultrasonic sensor, an optical sensor, or the like. The detection apparatus 31 may detect a position of the head of the user 33 using the sensor and detect the positions of the left eye 35L and the right eye 35R based on the position of the head. The detection apparatus 31 may detect the positions of the left eye 35L and the right eye 35R as coordinates in a three-dimensional space using one or more sensors.

The image projection apparatus 1a does not need to include the detection apparatus 31. When the image projection apparatus 1a does not include the detection apparatus 31, the image projection apparatus 1*a* may include an input terminal for receiving a signal input from an external detection apparatus. The external detection apparatus may be connected to the input terminal. The external detection apparatus may use an electrical signal or an optical signal as a transmission signal to be transmitted in respect of the input terminal. The external detection apparatus may be indirectly connected to the input terminal via a common network. The controller 30 may receive an input of position coordinates indicating the positions of the left eye 35L and the right eye 35R acquired from the external detection apparatus. The controller 30 may calculate a moving distance of the left eye 35L and the right eye 35R based on the position coordinates.

Figure 9:
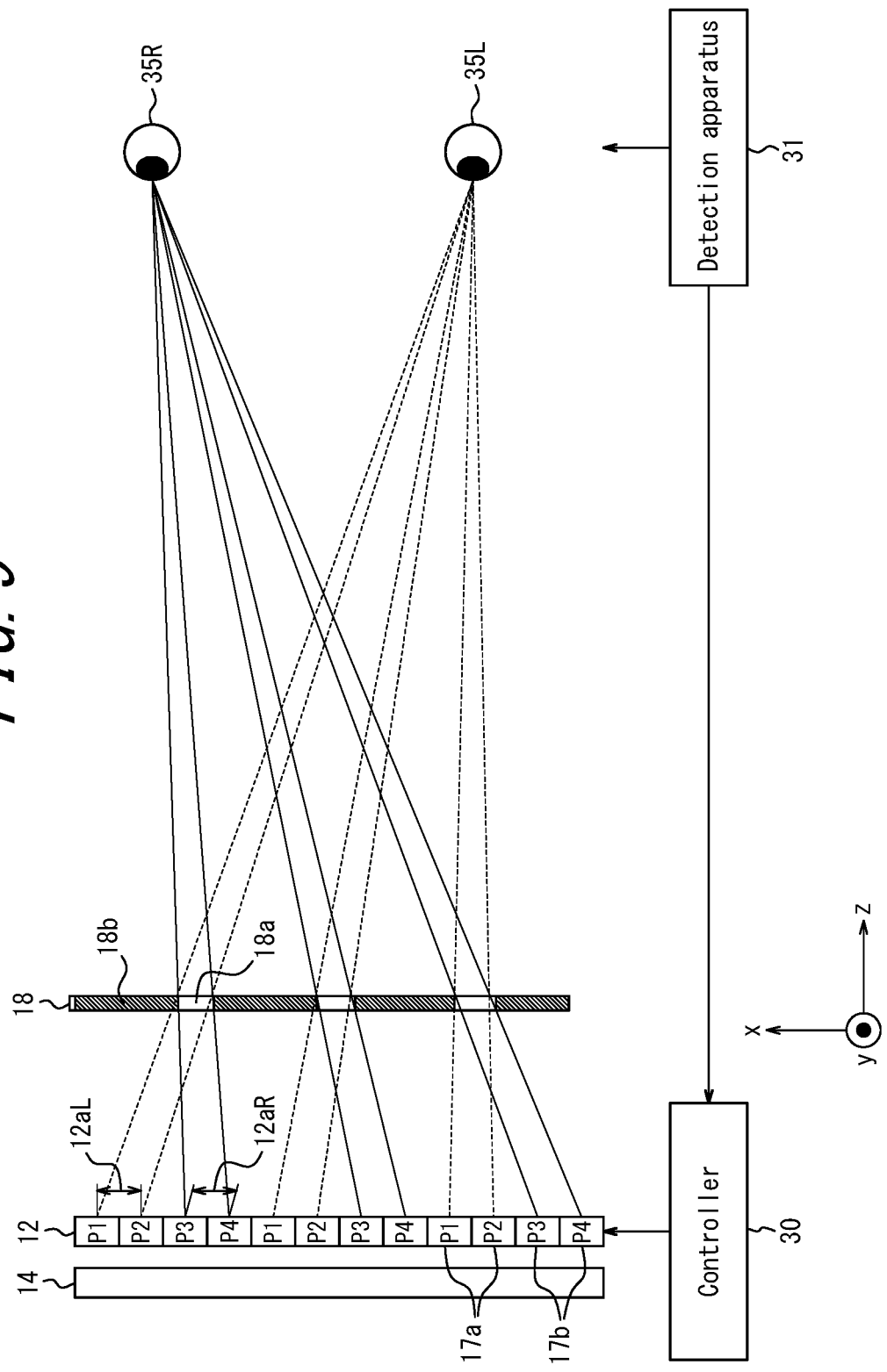
FIG. 9 is a diagram for explaining a stereoscopic image display by the image projection apparatus.
Figure 10:
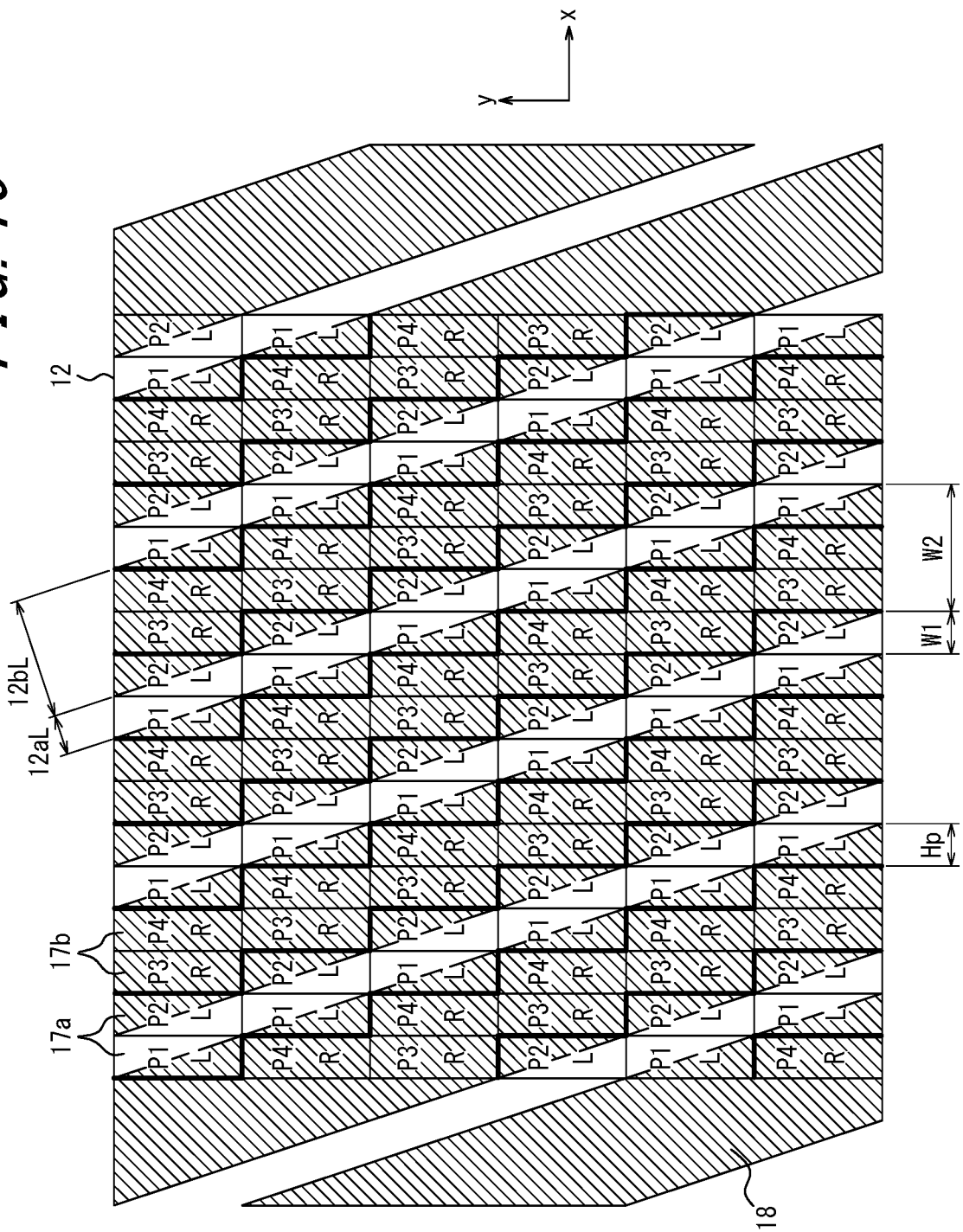
FIG. 10 is a diagram for explaining an arrangement relationship between the display surface to be seen by a left eye and a third optical element.

A display method of a stereoscopic image by the image projection apparatus 1*a* will be described with reference to FIG. 9 and FIG. 10. FIG. 9 and FIG. 10 are diagrams that do not distinguish between the first region A1 and the second region A2 of the display surface 12, between the third region A3 and the fourth region A4 of the third optical element 18, and between the first projection light L1 and the second projection light L2, for simplicity purposes. FIG. 9 and FIG. 10 correspond to both the first projection light L1 that is emitted from the first region A1 of the display surface 12 and passes through the third region A3 of the third optical element 18, and the second projection light L2 that is emitted from the second region A2 of the display surface 12 and passes through the fourth region A4 of the third optical element 18. Also, the first optical element 21, the second optical element 22, the concave mirror 34*a*, and the windshield 24 are omitted, and the optical paths are drawn linearly in FIG. 9.

The controller 30 controls an image to be displayed on the display surface 12 of the display 11 based on the positions of the left eye 35L and the right eye 35R of the user 33 detected by the detection apparatus 31. When the positions of the left eye 35L and the right eye 35R are at a reference position, two first subpixels 17*a* for respectively displaying an image to be seen by the left eye 35L and two second subpixels 17*b* for respectively displaying an image to be seen by the right eye 35R are alternately arranged in the x direction in the display surface 12. The subpixels P1 and P2 are the first subpixels 17*a* in FIG. 9. The subpixels P3 and P4 are the second subpixels 17*b*.

The left eye 35L of the user 33 can see the first subpixels 17*a* (P1 and P2) partially included in the left eye visible region 12*a*L in the display surface 12 through the light transmitting region 18*a* of the third optical element 18, as indicated by the broken lines. The right eye 35R of the user 33 can see the second subpixels 17*b* (P3 and P4) partially included in the right eye visible region 12*a*R in the display surface 12 through the light transmitting region 18*a* of the third optical element 18, as indicated by the solid lines. Thus, the left eye 35L and the right eye 35R of the user 33 can see different images. In other words, projection light emitted from the first subpixels 17*a* is projected to the left eye 35L of the user 33, and projection light emitted from the second subpixels 17*b* is projected to the right eye 35R of the user 33. The controller 30 causes the first subpixels 17*a* and second subpixels 17*b* to display images having a parallax therebetween, and thus can present a stereoscopic image to the user 33.

Projection light that is emitted from the first subpixels 17*a* in the first region A1 of the display surface 12 and projected to the left eye 35L will be referred to as first left eye projection light, and projection light that is emitted from the second subpixels 17*b* in the first region A1 and projected to the right eye 35R will be referred to as first right eye projection light. Also, projection light that is emitted from the first subpixels 17*a* in the second region A2 of the display surface 12 and projected to the left eye 35L will be referred to as second left eye projection light, and projection light that is emitted from the second subpixels 17*b* in the second region A2 and emitted to the right eye 35R will be referred to as second right eye projection light. The first projection light L1 includes first left eye projection light and first right eye projection light. The second projection light L2 includes the second right eye projection light and the second left eye projection light.

The third region A3 of the third optical element 18 separates the first projection light L1 into the first left eye projection light that is emitted from the first subpixels 17*a* and projected to the left eye 35L of the user 33 and the first right eye projection light that is emitted from the second subpixels 17*b* and projected to the right eye 35R of the user 33. The fourth region A4 of the third optical element 18 separates the second projection light L2 into the second left eye projection light that is emitted from the first subpixels 17*a* and projected to the left eye 35L and the second right eye projection light that is emitted from the second subpixels 17*b* and projected to the right eye 35R.

An example arrangement of the first subpixel 17*a* and the second subpixel 17*b* displayed in the display surface 12 will be described with reference to FIG. 10. FIG. 10 illustrates the display surface 12 and the third optical element 18 viewed from the left eye 35L of the user 33. However, the subpixels 17 in the display surface 12 that is positioned on the rear side of, and thus concealed by, the third optical element 18 are illustrated in the figure, for the explanation purposes. The user 33 sees the display 11 and the third optical element 18 as enlarged virtual images. The arrangement of the subpixels 17 is illustrated in FIG. 10 by way of example only, and may be varied in a number of manners based on inclinations, widths, and the like of the light transmitting regions 18*a* and the light shielding regions 18*b* of the third optical element 18 serving as a parallax barrier.

A combination of the subpixels P1 and P2 serving as the first subpixels 17*a* and a combination of the subpixels P3 and P4 serving as the second subpixel 17*b* are arranged in the display surface 12 illustrated in FIG. 10, such that the subpixels P1, P2, P3, and P4 are repetitively arranged in the x direction. The subpixels P1 and P2 are denoted by the reference sign 'L' indicating that they display an image to be seen by the left eye 35L, and the subpixels P3 and P4 are denoted by the reference sign 'R' indicating that they display an image to be seen by the right eye 35R, in FIG. 10. In a row shifted by one row in the negative y direction in the display surface 12, the subpixels P1, P2, P3, and P4 are repetitively arranged shifted by one subpixel in the positive x direction. The border lines between the first subpixels 17*a* and the second subpixels 17*b* are emphasized in FIG. 10.

The third optical element 18 that can be seen by the left eye 35L is displayed in the display surface 12 in an overlapping manner in FIG. 10. The left eye visible region 12*a*L is a region on the display surface 12 that can be seen by the left eye 35L. The left eye light shielding region 12*b*L is a region that is blocked by the light shielding region 18*b* of the third optical element 18 and thus cannot be seen by the left eye 35L of the user 33. A light transmission width W1 serving as an x-direction width of the left eye visible region 12*a*L corresponds to a transverse width of one subpixel. The light transmission width W1 corresponds to a width of the light transmitting region 18*a* of the third optical element 18. A light shielding width W2 serving as an x-direction width of a left eye light shielding region 12*b*L corresponds to a total of the transverse widths of three subpixels. The light shielding width W2 corresponds to the width of the light shielding region 18b of the third optical element 18. The barrier aperture ratio of the image projection apparatus 1a of the present embodiment is 25%. Because the barrier aperture ratio is 25% according to the present embodiment, the occurrence of crosstalk is reduced, as compared to a case with a larger barrier aperture ratio (e.g., 50%). Crosstalk refers to a phenomenon according to which a portion of an image to be seen by the right eye 35R is seen by the left eye 35L of the user 33 and/or a portion of an image to be seen by the left eye 35L is seen by the right eye 35R. Note that the light transmitting width W1, the light shielding width W2, and the barrier aperture ratio described above are presented by way of example only. The image projection apparatus 1a may employ various barrier aperture ratios other than 25%.

When the positions of the left eye 35L and the right eye 35R of the user 33 are shifted in the horizontal direction, a relative positional relationship between the display surface 12 that can be seen by the left eye 35L and the right eye 35R and the third optical element 18 changes. The position of the left eye 35L and the right eye 35R where crosstalk does not occur as illustrated in FIG. 10 is defined as the reference position. When the third optical element 18 is displaced in the x direction from the state illustrated in FIG. 10, a portion of the subpixel P3 becomes included in the left eye visible region 12aL. When the third optical element 18 is displaced in the x direction from the state illustrated in FIG. 10, a portion of the subpixel P1 included in the left eye light shielding region 12bL increases. The controller 30 may switch the image displayed by the subpixels P1 to P4 between the image to be seen by the left eye 35L and the image to be seen by the right eye 35R, based on the positions of the left eye 35L and the right eye 35R acquired from the detection apparatus 31, in order to minimize crosstalk.

The image projection apparatus 1a projects the image to be seen by the left eye 35L at the imaging position of the first virtual image VI1 on the far side within the field of view of the user 33, formed by the first left eye projection light emitted from the first subpixels 17a of the first region A1 of the display surface 12. Also, the image projection apparatus 1a projects the image to be seen by the right eye 35R at the imaging position of the first virtual image VI1 on the far side within the field of view of the user 33, formed by the first right eye projection light emitted from the second subpixels 17b of the first region A1 of the display surface 12. The first left eye projection light and the first right eye projection light cause the first virtual image VI1 having a parallax and thus serving as a stereoscopic image to be imaged within the field of view of the user 33.

Further, the image projection apparatus 1a projects the image to be seen by the left eye 35L at the imaging position of the second virtual image V12 on the near side within the field of view of the user 33, formed by the second left eye projection light emitted from the first subpixels 17a of the second region A2 of the display surface 12. Also, the image projection apparatus 1a projects the image to be seen by the right eye 35R at the imaging position of the second virtual image VI2 on the near side within the field of view of the user 33, formed by the second right eye projection light emitted from the second subpixels 17b of the second region A2 of the display surface 12. The second left eye projection light and the second right eye projection light cause the second virtual image VI2 having a parallax and thus serving as a stereoscopic image to be imaged within the field of view of the user 33.

The third region A3 of the third optical element 18 is projected as a third virtual image VI3 at a position adjacent to the first virtual image VI1 in the rearward direction, i.e., between the user 33 and the first virtual image VI1. In practice, the third virtual image VI3 is not perceived by the user 33. The user 33 sees an image formed as if a magnified first region A1 of the display surface 12 is located at the position of the first virtual image VI1, and a magnified third region A3 of the third optical element 18 is located at the position of the third virtual image VI3.

The fourth region A4 of the third optical element 18 is projected as a fourth virtual image VI3 at a position adjacent to the second virtual image VI2 in the rearward direction, i.e., between the user 33 and the second virtual image VI2. In practice, the fourth virtual image VI4 is not perceived by the user 33. The user 33 sees an image as if a magnified second region A2 of the display surface 12 is located at the position of the second virtual image VI2, and a magnified fourth region A4 of the third optical element 18 is located at the position of the fourth virtual image VI4.

The controller 30 causes the first subpixels 17a and the second subpixels 17b in the first region A1 of the display surface 12 to display a stereoscopic image that generates parallax corresponding to a relatively long distance, near the imaging position of the first virtual image VI1, to be seen by the user 33. The controller 30 causes the first subpixels 17a and the second subpixels 17b in the second region A2 of the display surface 12 to display a stereoscopic image that generates parallax corresponding to a relatively short distance, near the imaging position of the second virtual image VI2, to be seen by the user 33. The controller 30 may cause each of the first subpixels 17a and the second subpixels 17b in any one of the first region A1 and the second region A2 to display an image having parallax corresponding to a position between the imaging position of the first virtual image VI1 and the imaging position of the second virtual image VI2. The image projection apparatus 1 according to the first embodiment can display an image only at the imaging position of the first virtual image VI1 and the imaging position of the second virtual image VI2. According to the present embodiment, on the other hand, a stereoscopic image that gives a sense of a distance different from the distances to these two locations can be displayed, while a virtual image is projected to the imaging position of the first virtual image VI1 and the imaging position of the second virtual image VI2. By displaying the stereoscopic image that has a distance due to the parallax at one of the positions of the first virtual image VI1 and the second virtual image VI2 where the distance due to the parallax is closer to the imaging distance of the virtual image, the image projection apparatus 1a can display the stereoscopic image in a wide distance range, without giving the user 33 a sense of discomfort.

Figure 11:
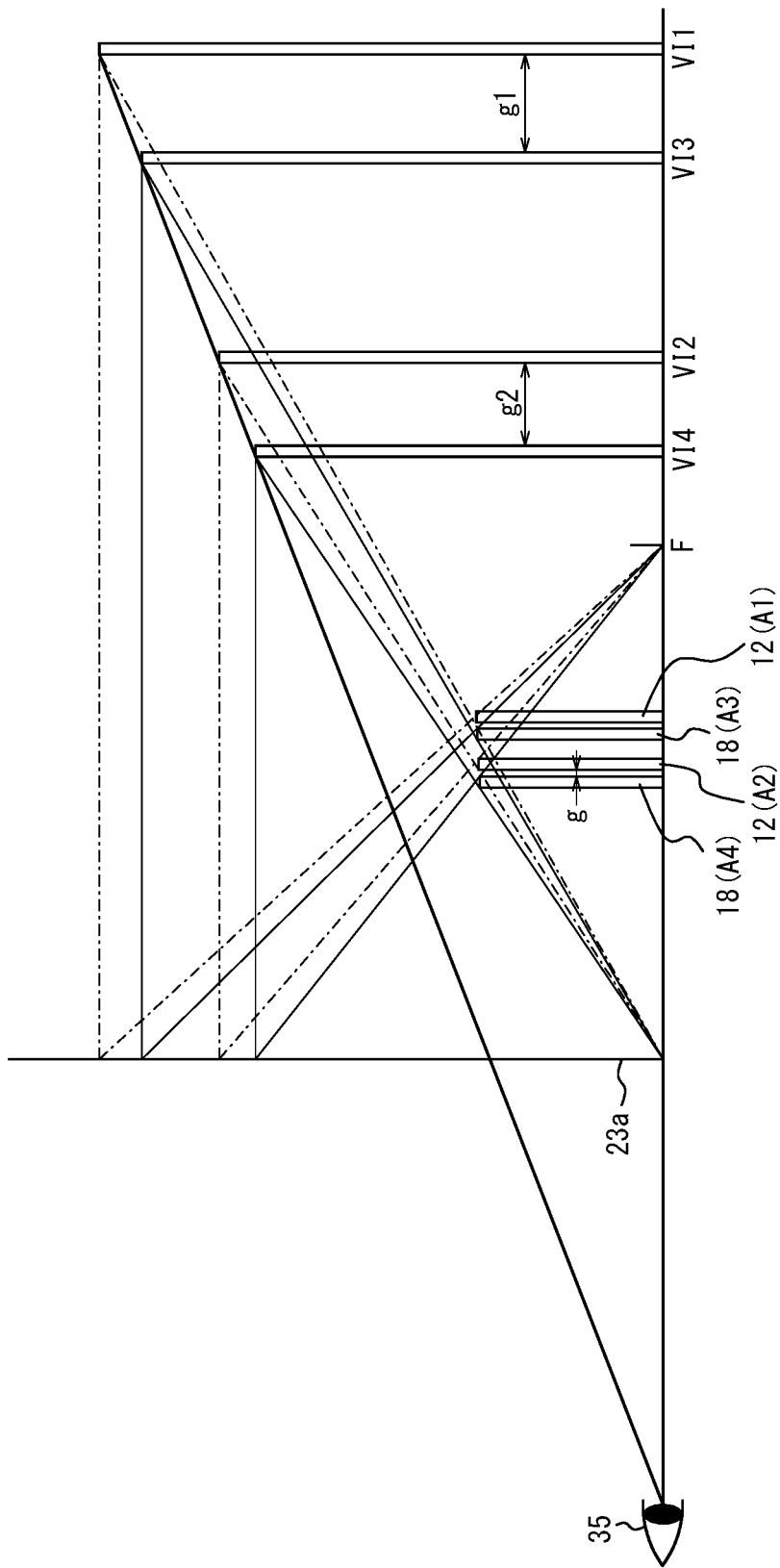
FIG. 11 is a diagram illustrating an optical path indicating the display surface and the imaging of a virtual image by the third optical element.

FIG. 11 illustrates a diagram of optical paths indicating the virtual image VI1 and the virtual image VI3 that are images of the first region A1 of the display surface 12 and the third region A3 of the third optical element 18, respectively, and seen by the eyes 35 of the user 33. In the figure, F represents a focal position of the concave mirror 23a. The first region A1 of the display surface 12 is denoted by the reference sign '12(A1)'. The third region A3 of the third optical element 18 is denoted by the reference sign '18(A3)'. FIG. 11 also illustrates the virtual image VI2 and the virtual image VI4 that are images of the second region A2 of the display surface 12 and the fourth region A4 of the third optical element 18, respectively, and seen by the eyes 35 of the user 33. The second region A2 of the display surface 12 is denoted by the reference sign '12(A2)'. The fourth region A4 of the third optical element 18 is denoted by the reference sign '18(A4)'. A difference between the distance from the eyes 35 to the first region A1 of the display surface 12 and the distance from the eyes 35 to the second region A2 of the display surface 12 is generated by the difference between the optical path of the first projection light L1 and the optical path of the second projection light L2. Similarly, a difference between the distance from the eyes 35 to the third region A3 of the third optical element 18 and the distance from the eyes 35 to the fourth region A4 of the third optical element 18 is generated by the difference between the optical path of the first projection light L1 and the optical path of the second projection light L2.

When viewing the virtual images VI1 and VI2 of the display surface 12 that appear in the same size from the same angle of view from the eyes 35, the third region A3 (18(A3)) of the third optical element 18 as a substance and the fourth region A4 (18(A4)) of the third optical element 18 are in different sizes, as illustrated in FIG. 11. In FIG. 11, the virtual images VI1 and VI2 have different heights. Also, a gap g1 between the virtual image VI1 of the display surface 12 and the virtual image VI3 of the third optical element 18 that are on the far side and a gap g2 between the virtual image VI2 of the display surface 12 and the virtual image VI4 of the third optical element 18 that are on the near side are different from each other. Thus, the third optical element 18 can employ different pitches of the parallax barrier so as to differ a preferred viewing distance of the third region A3 and a preferred viewing distance of the fourth region A4 from each other. The preferred viewing distance is a distance between the third optical element 18 and the eyes 35 of the user 33 optimum for observation of a stereoscopic image. The distance between the reference position of the eyes 35 and the third virtual image VI3 and the distance between the reference position of the eyes 35 and the fourth virtual image VI4 are designed to meet the preferred viewing distance.

When d represents the preferred viewing distance, E represents the distance between the eyes of the user 33, Hp represents the horizontal length of the subpixel 17, g represents the gap, n represents the number of first subpixels 17a arranged in the horizontal direction (n=2 in the present embodiment), and Bp represents the pitch of the parallax barrier of the third optical element 18, the preferred distance is calculated from the following equations.

$$E:d=(n\times Hp):g \quad \text{Equation (1)}$$

$$D:Bp=(d+g):(2\times n\times Hp) \quad \text{Equation (2)}$$

Due to the difference between the apparent gaps g1 and g2 in the virtual images and the preferred viewing distance d, the pitch of the light transmitting regions 18a and the light shielding regions 18b may be different between the third region A3 and the fourth region A4 of the third optical element 18. Also, the x direction length and the y direction length of the light transmitting region 18a may be different between the third region A3 and the fourth region A4 of the third optical element 18.

According to the present embodiment, because the subpixels 17 are arranged in the x direction and the subpixels 17 constituting different pixels 16 are arranged in the y direction intersecting the x direction in the display surface 12, the widths of the light transmitting region 18a and the light shielding region 18b of the third optical element 18 can be reduced. Thus, the resolutions of the virtual images VI1 and VI2 can be increased.

Figure 12:
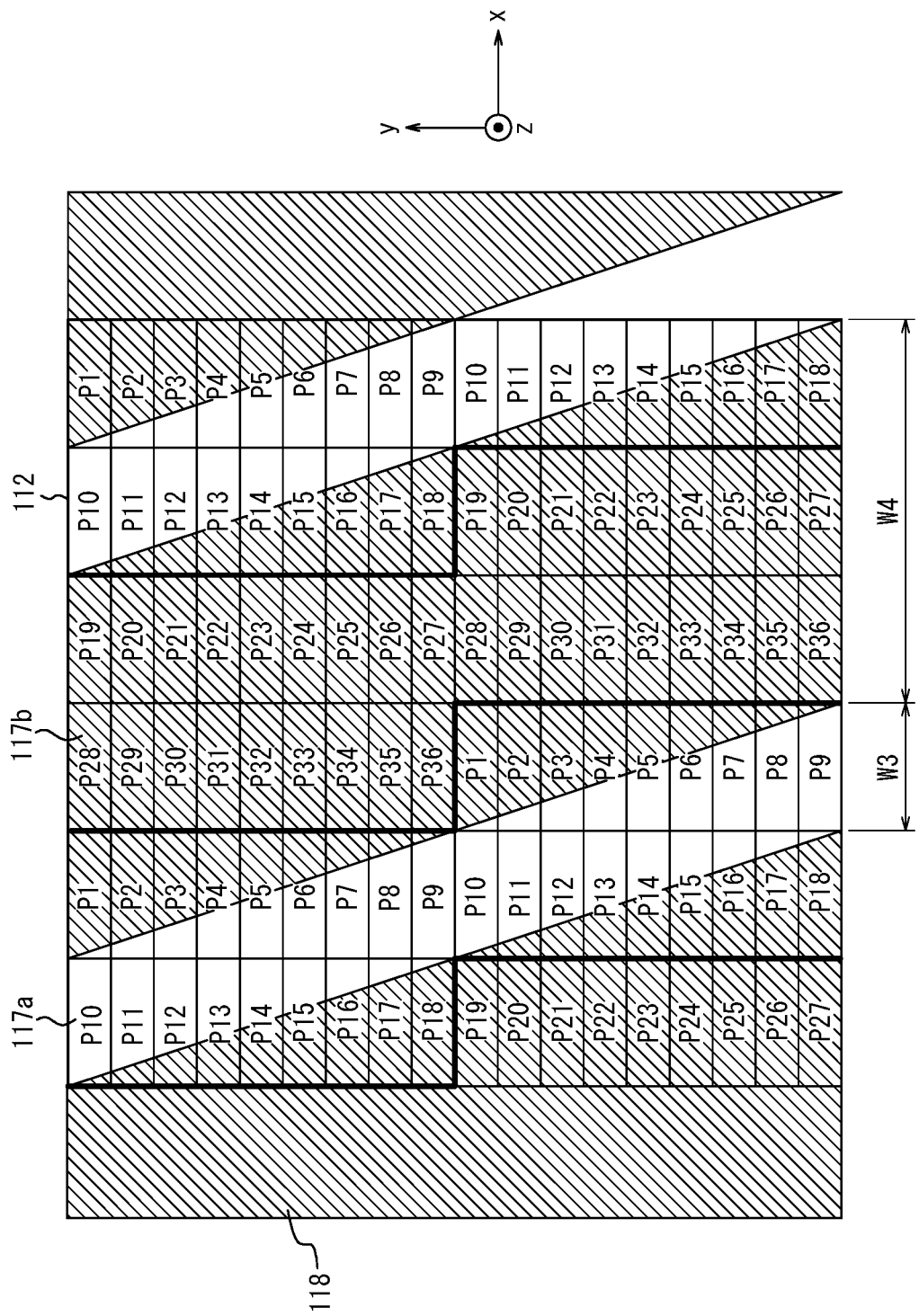
FIG. 12 is a diagram for explaining an example arrangement relationship between a display surface and a third optical element in a conventional image projection apparatus.

In the conventional image projection apparatus 101 illustrated in FIG. 4 and FIG. 5, the widths of the subpixels 117 in the x direction are longer than the widths in the y direction in the display surface 112. When the display surface 112 employs the third optical element 118 having the same barrier aperture ratio and the same inclination of the light transmitting region 18a of the second embodiment, the light transmitting width W3 and the light shielding width W4 become those as illustrated in FIG. 12. The subpixels P1 to P18 are first subpixels 117a for displaying an image to be seen by a left eye 135L, in FIG. 12. The subpixels P19 to P36 are second subpixels for displaying an image to be seen by a right eye 135R. When the aspect ratio of the subpixel 117 is 1:3, the light transmitting width W3 is three times the light transmitting width W1 in a case in which the subpixel 17 is arranged such that the widths in the y direction are longer than the widths in the x direction, as illustrated in FIG. 10. When the aspect ratio of the subpixel 117 is 1:3, the light shielding width W4 is three times the light shielding width W4 in a case in which the subpixel 17 is arranged such that the widths in the y direction are longer than the widths in the x direction, as in the second embodiment illustrated in FIG. 10. Thus, when a stereoscopic image is displayed based on a parallax using the subpixel 117 arranged as illustrated in FIG. 12, the resolution significantly deteriorates. According to the present embodiment, on the other hand, because the widths of the light transmitting regions 18a and the light shielding regions 18b can be reduced, a high resolution image can be displayed.

Third Embodiment

An image projection apparatus 1b according to a third embodiment will be described with reference to FIG. 13 and FIG. 14. Hereinafter, features of the image projection apparatus 1b different from the image projection image 1a of the second embodiment will be described. The constituent elements similar to those of the image projection apparatus 1a of the second embodiment will be denoted by the same reference signs, and descriptions thereof will be omitted.

As can be seen in FIG. 13 viewing the image projection apparatus 1b in the y direction, the image projection apparatus 1b includes an illumination unit 14a of the projection light emission unit 10a configured as a side backlight, rather than a direct backlight. The illumination unit 14a is arranged in the instrumental panel of the mobile body 32 as a vehicle, together with the display 11, the third optical element 18, a first optical element 21a, a second optical element 22, and the concave mirror 23a.

The light source 13a and the heat radiation fin 15a of the illumination unit 14a are positioned at an edge on the side of the first region A1 of the display surface 12 (on the side the first projection light L1 is emitted). The first region A1 of the display surface 12 is positioned on the side of the center console of the mobile body 32. The center console of the mobile body 32 is located in the center of the left-right direction, when viewed in the traveling direction of the mobile body 32. In the instrument panel of the mobile body 32, a central portion has a larger space for accommodating instruments than end portions when viewed in the traveling direction. Arranging the light source 13a and the heat radiation fin 15a on the center console side facilitates designing and arranging the image projection apparatus 1b.

The image projection apparatus 1b further includes the first optical element 21a that can shift between a first state and a second state, in place of the first optical element 21 which is fixedly arranged. The shift includes a rotation and translation. The first optical element 21a is a reflecting optical element such as a mirror, in a manner similar to the first optical element 21 of the first and second embodiments. The first optical element 21a can be rotated about its one end along the y direction serving a rotary axis, using a driving apparatus such as a stepping motor. The driving apparatus may be controlled by the controller 30.

FIG. 13 illustrates the first state of the first optical element 21a in which the first optical element 21a is arranged in the optical path of the first projection light L1 emitted from the first region A1 of the display surface 12. In this state, the first optical element 21a reflects the first projection light L1 toward the second optical element 22, in a manner similar to the second embodiment. As a result, the image projection apparatus 1b can display the first virtual image VI1 and the second virtual image VI2 at different imaging distances that form a stereoscopic image within the field of view of the user 33, in a manner similar to the second embodiment.

FIG. 14 illustrates the second state of the first optical element 21a in which the first optical element 21a is rotated from the state illustrated in FIG. 13 and stops interfering with the optical path of the first projection light L1. In this state, the first projection light L1 is not reflected by the first optical element 21a and is projected abreast with the second projection light L2. The first projection light L1 and the second projection light L2 are projected into the field of view of the user 33 via the concave mirror 23a and the windshield 24. As a result, a large virtual image, which is double the size in the horizontal direction, is displayed at a distance where the second virtual image VI2 is seen within the field of view of the user 33 on the near side.

The first optical element 21a may be positioned on the central side of the mobile body 32, i.e., on the center console side, with respect to the second optical element 22. Arranging the first optical element 21a having a driving unit on the center console side, which has more space, facilitates the design and arrangement of the image projection apparatus 1b.

Note that the manner by which the first optical element 21a is shifted is not limited to rotation. For example, the first optical element 21a may be configured to displace in the y direction and enter or withdraw from the optical path of the first projection light L1.

The image projection apparatus 1b of the present embodiment can switch between the display of two screens of the first virtual image VI1 and the second virtual image VI2 at different projection distances and the display of one large screen at the distance of the second virtual image VI2. Also, because the light source 13a and the heat radiation fin 15a of the illumination unit 14a and the first optical element 21a are arranged on the central side of the mobile body 32, design and arrangement of the image projection apparatus 1b can be facilitated.

Although the above embodiments have been described as representative examples, it will be apparent to those skilled in the art that various modifications and substitutions can be made within the spirit and scope of the present disclosure. Thus, the above embodiments should not be construed as limiting the present disclosure and may be varied or changed in a variety of manners without departing from the scope of the appended claims. For example, although the illumination unit includes the light source in the above embodiments, the image projection apparatus may illuminate the display with light from an external light source. Although the light transmitting regions and the light shielding regions extend in a diagonal direction of subpixels in the second embodiment, this is not restrictive. The light transmitting regions and the light shielding regions may extend in a direction along the y direction, without being inclined. The direction in which the light transmitting regions and the light shielding regions extend may be set at various inclinations with respect to the y direction of the display surface. Although the display surface is separated into two regions and the virtual images are displayed at two different distances from the user in the above embodiments, the display surface may be separated into three or more regions and three or more virtual images may be displayed at three or more different distances. Although the image projection apparatus is mounted in the mobile body in the above embodiments, the image projection apparatus of the present disclosure can be used for other purposes. For example, the image projection apparatus of the present disclosure may be mounted in game equipment, a drive simulation apparatus, or the like.

In the present disclosure, descriptions such as "first", "second" and the like are example identifiers for distinguishing the configurations. In the present disclosure, the configurations distinguished by "first", "second" and the like may interchange their numbers in the configurations. For example, the identifiers "first" and "second" of the first optical element and the second optical element may be interchanged. Such interchange is simultaneously performed. The configurations remain distinguished from one another after the interchange of the identifiers. The identifiers may be removed. In a configuration in which the identifiers are removed, the configurations are distinguished by their reference signs. In the present disclosure, the identifiers such as "first" and "second" should not be used alone as a basis for the interpretation that there is a sequence of constituent elements, or for the presence of an identifier with a smaller number.

The term "mobile body" used herein may encompass, for example, vehicles, ships, and aircrafts. Vehicles may include automobiles and industrial vehicles. Vehicles are not limited thereto but may include rail vehicles, domestic vehicles, and fixed-wing aircrafts that travel on a runway. Automobiles may include, for example, cars, trucks, buses, motorcycles, and trolley buses. Automobiles are not limited thereto but may include other automobiles that travels on the road. Industrial vehicles may include, for example, agricultural vehicles and construction vehicles. Industrial vehicles may include, for example, forklifts and golf carts. Industrial vehicles for agricultural purpose may include, for example, tractors, tillers, transplanters, binders, combined harvesters, and lawn mowers. Industrial vehicles for construction purposes may include, for example, bulldozers, scrapers, excavators, crane trucks, dump trucks, and load rollers. The vehicles may include human-power vehicles traveling on human power. Classification of the vehicles is not limited to the above. For example, vehicles may include industrial vehicles authorized to travel on the road, and a plurality of categories may include the same type of vehicle. Ships may include, for example, watercrafts, boats, and tankers. Aircraft may include, for example, fixed wing aircraft and rotorcraft.

REFERENCE SIGNS LIST 1, 1a, 1b image projection apparatus
10 projection light emission unit
11 display
12 display surface
12a visible region
12aL left eye visible region
12aR right eye visible region 13, 13a light source
14, 14a illumination unit
15, 15a radiation fin
16 pixel
17 subpixel
17a first subpixel
17b second subpixel
18 third optical element
18a transmission region
18b shielding region
21, 21a first optical element
22 second optical element
23 optical system
23a concave mirror
24 windshield
30 controller
31 detection apparatus
32 mobile body
33 user
35 eye
35L left eye
35R right eye
L1 first projection light
L2 second projection light
A1 first field
A2 second field
A3 third field
A4 fourth field
VI1 first virtual image (far side virtual image)
VI2 second virtual image (near side virtual image)
W1, W3 light transmission width
W2, W4 light shielding width

The invention claimed is:

1. An image projection apparatus comprising:
a projection light emission unit having a display surface in which a first region and a second region are arranged along a first direction;
a first optical element for reflecting first projection light emitted from the first region,
a second optical element for reflecting the first projection light reflected by the first optical element and transmitting second projection light emitted from the second region; and
an optical system for projecting the first projection light reflected by the second optical element and the second projection light transmitted by the second optical element into a field of view of a user,
wherein the first direction corresponds to a direction in which both eyes are aligned when the first projection light and the second projection light are projected into the field of view of the user, and the display surface includes subpixels constituting one pixel arranged in the first direction and subpixels constituting different pixels in a second direction that intersects the first direction.

2. The image projection apparatus according to claim 1, wherein the first optical element reflects the first projection light in the first direction.

3. The image projection apparatus according to claim 1, wherein the first projection light includes first left eye projection light that is emitted from a first subpixel in the first region for displaying a left eye image and projected to a left eye of the user, and first right eye projection light that is emitted from a second subpixel in the first region for displaying a right eye image and projected to a right eye of the user.

4. The image projection apparatus according to claim 1, wherein the second projection light includes second left eye projection light that is emitted from a first subpixel in the second region for displaying a left eye image and projected to a left eye of the user, and second right eye projection light that is emitted from a second subpixel in the second region for displaying a right eye image and projected to a right eye of the user.

5. The image projection apparatus according to claim 1, wherein each of the subpixels in the first region and the subpixels in the second region includes a first subpixel for displaying a left eye image and a second subpixel for displaying a right eye image, and
the image projection apparatus comprising a third optical element configured to separate the first projection light into first left eye projection light emitted from the first subpixel and to be projected to the left eye of the user and first right eye projection light emitted from the second subpixel and projected to the right eye of the user, and also to separate the second projection light into second left eye projection light emitted from the first subpixel and projected to the left eye and second right eye projection light emitted from the second subpixel and projected to the right eye.

6. The image projection apparatus according to claim 5, wherein the third optical element includes a third region for separating the first projection light into the first left eye projection light and the first right eye projection light, and a fourth region for separating the second projection light into the second left eye projection light and the second right eye projection light.

7. The image projection apparatus according to claim 6, wherein the third optical element comprises light transmitting regions which have a pitch that differs between the third region and the fourth region.

8. The image projection apparatus according to claim 6, wherein the third optical element comprises light transmitting regions which have a size with respect to a subpixel that differs between the third region and the fourth region.

9. The image projection apparatus according to claim 1, the projection light emission unit further comprising a light source for illuminating the display surface,
wherein the light source is positioned at an edge of a first region side.

10. The image projection apparatus according to claim 1, wherein a first optical path of the first projection light emitted from the first region to the optical system is longer than a second optical path of the second projection light emitted from the second region to the optical system.

11. A mobile body comprising:
an image projection apparatus that include:
a projection light emission unit having a display surface in which a first region and a second region are arranged along a first direction;
a first optical element for reflecting first projection light emitted from the first region,
a second optical element for reflecting the first projection light reflected by the first optical element and transmitting second projection light emitted from the second region; and
an optical system for projecting the first projection light reflected by the second optical element and the second projection light transmitted by the second optical element into a field of view of a user,
wherein the first direction corresponds to a direction in which both eyes are aligned when the first projection light and the second projection light are projected into the field of view of the user, the display surface includes subpixels constituting one pixel arranged in the first direction and subpixels constituting different pixels in a second direction that intersects the first direction, and the optical system includes a windshield or a combiner for reflecting the first projection light and the second projection light toward an eye box of the user.

12. The mobile body according to claim 11, wherein each of the subpixels in the first region and the subpixels in the second region includes a first subpixel for displaying a left eye image and a second subpixel for displaying a right eye image, and the image projection apparatus comprising a third optical element configured to separate the first projection light into first left eye projection light emitted from the first subpixel and to be projected to the left eye of the user and first right eye projection light emitted from the second subpixel and projected to the right eye of the user, and also to separate the second projection light into second left eye projection light emitted from the first subpixel and projected to the left eye and second right eye projection light emitted from the second subpixel and projected to the right eye.

13. The mobile body according to claim 11, wherein the first region is viewed as a virtual image in a forward direction of the mobile body by a user who is driving the mobile body.

14. The mobile body according to claim 11, wherein the projection light emission unit includes a light source located at an edge on a central side of the mobile body.

15. The mobile body according to claim 11, wherein a first optical path of the first projection light emitted from the first region to the optical system is longer than a second optical path of the second projection light emitted from the second region to the optical system.

* * * * *